US008406171B2

(12) United States Patent
Onggosanusi et al.

(10) Patent No.: US 8,406,171 B2
(45) Date of Patent: Mar. 26, 2013

(54) NETWORK MIMO REPORTING, CONTROL SIGNALING AND TRANSMISSION

(75) Inventors: Eko N. Onggosanusi, Allen, TX (US); Runhua Chen, Dallas, TX (US); Il Han Kim, Dallas, TX (US); Badri N. Varadarajan, Dallas, TX (US); Anand G. Dabak, Plano, TX (US); Charles K. Sestok, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 875 days.

(21) Appl. No.: 12/534,851

(22) Filed: Aug. 3, 2009

(65) Prior Publication Data

US 2010/0027456 A1 Feb. 4, 2010

Related U.S. Application Data

(60) Provisional application No. 61/085,668, filed on Aug. 1, 2008, provisional application No. 61/087,825, filed on Aug. 11, 2008.

(51) Int. Cl.
*H04W 40/00* (2009.01)

(52) U.S. Cl. ........................................ 370/328; 370/334

(58) Field of Classification Search .................. 370/312, 370/336, 317, 318, 322, 328, 332, 333, 334; 455/7, 522; 375/141, 267
See application file for complete search history.

(56) References Cited

U.S. PATENT DOCUMENTS

| 8,014,331 | B2* | 9/2011 | Sarkar et al. | 370/312 |
|---|---|---|---|---|
| 2007/0010196 | A1* | 1/2007 | Periyalwar et al. | 455/7 |
| 2008/0049813 | A1* | 2/2008 | Kurose et al. | 375/141 |
| 2008/0080635 | A1* | 4/2008 | Hugl et al. | 375/267 |
| 2009/0059844 | A1* | 3/2009 | Ko et al. | 370/328 |
| 2010/0091743 | A1* | 4/2010 | Kazmi et al. | 370/336 |
| 2010/0110982 | A1* | 5/2010 | Roh et al. | 370/328 |
| 2011/0009157 | A1* | 1/2011 | Osterling et al. | 455/522 |
| 2011/0128917 | A1* | 6/2011 | Ko et al. | 370/328 |

* cited by examiner

*Primary Examiner* — Jeffrey M Rutkowski
*Assistant Examiner* — Syed M Bokhari
(74) *Attorney, Agent, or Firm* — Alan A. R. Cooper; Wade J. Brady III; Frederick J. Telecky, Jr.

(57) ABSTRACT

A coordinated multipoint transmitter is for use with a network MIMO super-cell and includes a coordination unit configured to provide joint link processing to coordinate a multipoint transmission corresponding to a set of transmission points. Additionally, the coordinated multipoint transmitter also includes a transmission unit configured to transmit the multipoint transmission using the set of transmission points. Additionally, a coordinated transmission receiver is for use with a network MIMO super-cell and includes a reception unit configured to receive a multipoint transmission corresponding to a set of transmission points. The coordinated transmission receiver also includes a processing unit configured to process the multipoint transmission from the set of transmission points.

24 Claims, 11 Drawing Sheets

NETWORK MIMO REPORTING, CONTROL SIGNALING AND TRANSMISSION

CROSS-REFERENCE TO PROVISIONAL APPLICATIONS

This application claims the benefit of U.S. Provisional Application No. 61/085,668, filed by Il Han Kim, Eko N. Onggosanusi and Runhua Chen on Aug. 1, 2008, entitled "Reporting Mechanisms in Network MIMO" commonly assigned with this application and incorporated herein by reference. This application also claims the benefit of U.S. Provisional Application No. 61/087,825 filed by Eko N. Onggosanusi, Il Han Kim, Runhua Chen, Badri N. Varadarajan and Anand Dabak on Aug. 11, 2008, entitled "Downlink Coordinated Transmission (Network MIMO)" commonly assigned with this application and incorporated herein by reference.

TECHNICAL FIELD

The present disclosure is directed, in general, to a communication system and, more specifically, to a coordinated multipoint transmitter, a coordinated transmission receiver and methods of operating a coordinated multipoint transmitter and a coordinated transmission receiver.

BACKGROUND

In a cellular network, such as one employing orthogonal frequency division multiple access (OFDMA), each cell employs a base station that communicates with user equipment. MIMO communication systems offer large increases in throughput due to their ability to support multiple parallel data streams that are each transmitted from different antennas. Theses systems provide increased data rates and reliability by exploiting a spatial multiplexing gain or spatial diversity gain that is available to MIMO channels. Although current data rates are adequate, improvements in this area would prove beneficial in the art.

SUMMARY

Embodiments of the present disclosure provide a coordinated multipoint transmitter, a coordinated transmission receiver and methods of operating a coordinated multipoint transmitter and a coordinated transmission receiver. In one embodiment, the coordinated multipoint transmitter is for use with a network MIMO super-cell and includes a coordination unit configured to provide joint link processing to coordinate a multipoint transmission corresponding to a set of transmission points. Additionally, the coordinated multipoint transmitter also includes a transmission unit configured to transmit the multipoint transmission using the set of transmission points.

In another embodiment, the coordinated transmission receiver is for use with a network MIMO super-cell and includes a reception unit configured to receive a multipoint transmission corresponding to a set of transmission points. The coordinated transmission receiver also includes a processing unit configured to process the multipoint transmission from the set of transmission points.

In another aspect, the method of operating a coordinated multipoint transmitter is for use with a network MIMO super-cell and includes providing joint link processing to coordinate a multipoint transmission corresponding to a set of transmission points and transmitting the multipoint transmission using the set of transmission points.

In yet another aspect, the method of operating a coordinated transmission receiver is for use with a network MIMO super-cell and includes receiving a multipoint transmission corresponding to a set of transmission points and processing the multipoint transmission from the set of transmission points.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION OF THE DRAWINGS

For a more complete understanding of the present disclosure, reference is now made to the following descriptions taken in conjunction with the accompanying drawings, in which.

DETAILED DESCRIPTION

Figure 1:
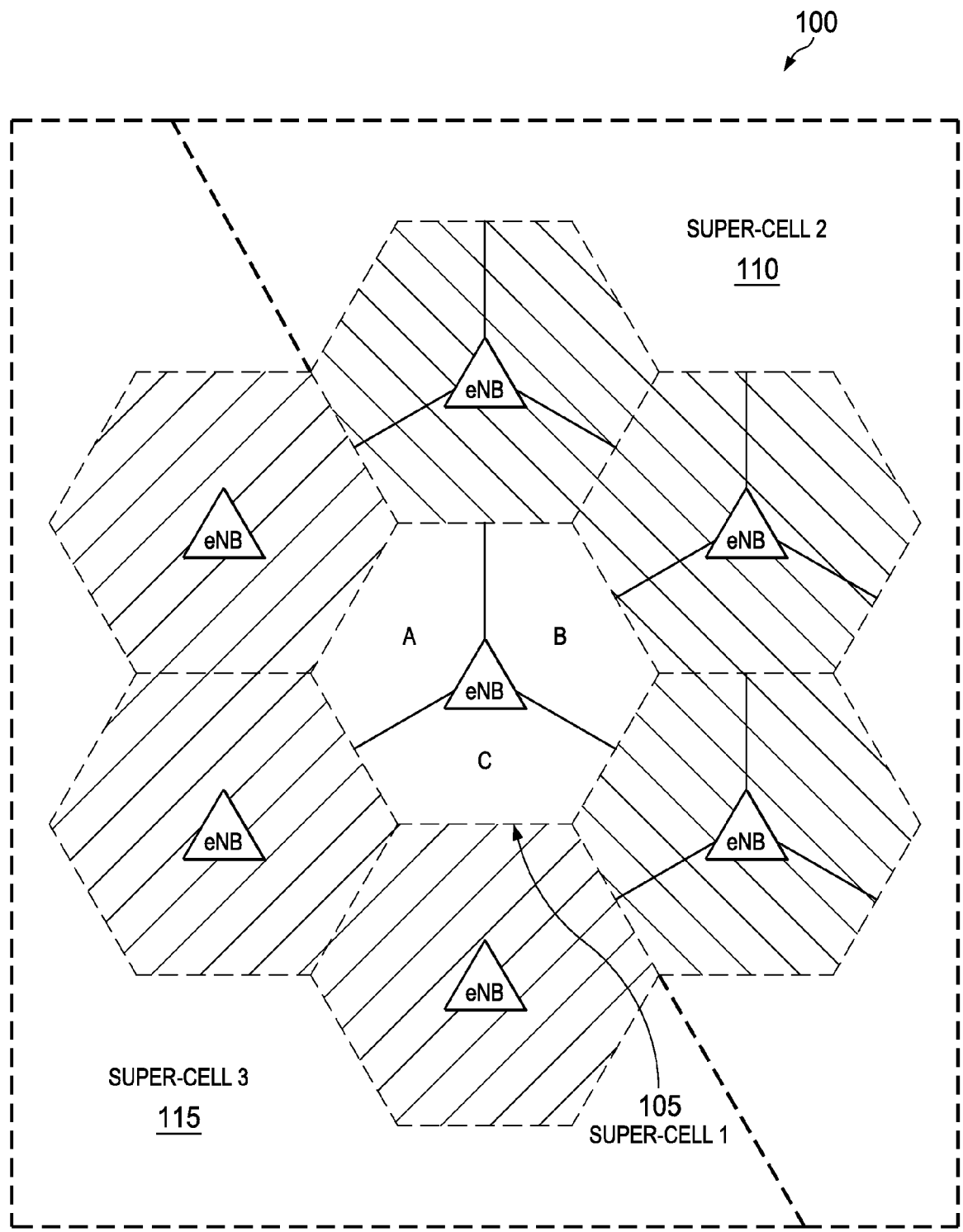
FIG. 1 illustrates a diagram of an exemplary cellular wireless network constructed according to the principles of the present disclosure.

FIG. 1 illustrates a diagram of an exemplary cellular wireless network 100 constructed according to the principles of the present disclosure. The cellular wireless network 100 includes a cellular grid having multiple cells or sectors. Note that a cell is defined as a geographic area where UEs are served by a single network identity (e.g. a base station). In practice, a cell can be of any physical shape and is not restricted to be a hexagon. For example in FIG. 1, each of the three sectors A, B, C may also be defined as a cell. The cellular wireless network 100 is representative of a network MIMO structure that is divided into a plurality of "super-cells" 105, 110, 115, where a super-cell consists of a cluster of cells or sectors. Each of the super-cells employs a coordinated multipoint transmitter.

Depending on the cell and network topology, multiple cells may be associated with a single base station (eNB), such as the first super-cell 105. In this example, a super-cell is formed from the three sectors A, B, C associated with a single eNB, as shown. That is, one eNB may send three different signals, where each of the three different signals is associated with a separate sector. Alternatively, it is possible to form a super-cell consisting of two or more cells, where each cell is associated with a different eNB, as shown for the second and third super-cells 110, 115. In the illustrated example, the second super-cell 110 may also employ individual sectors for each of the cells, as noted above.

Figure 2:
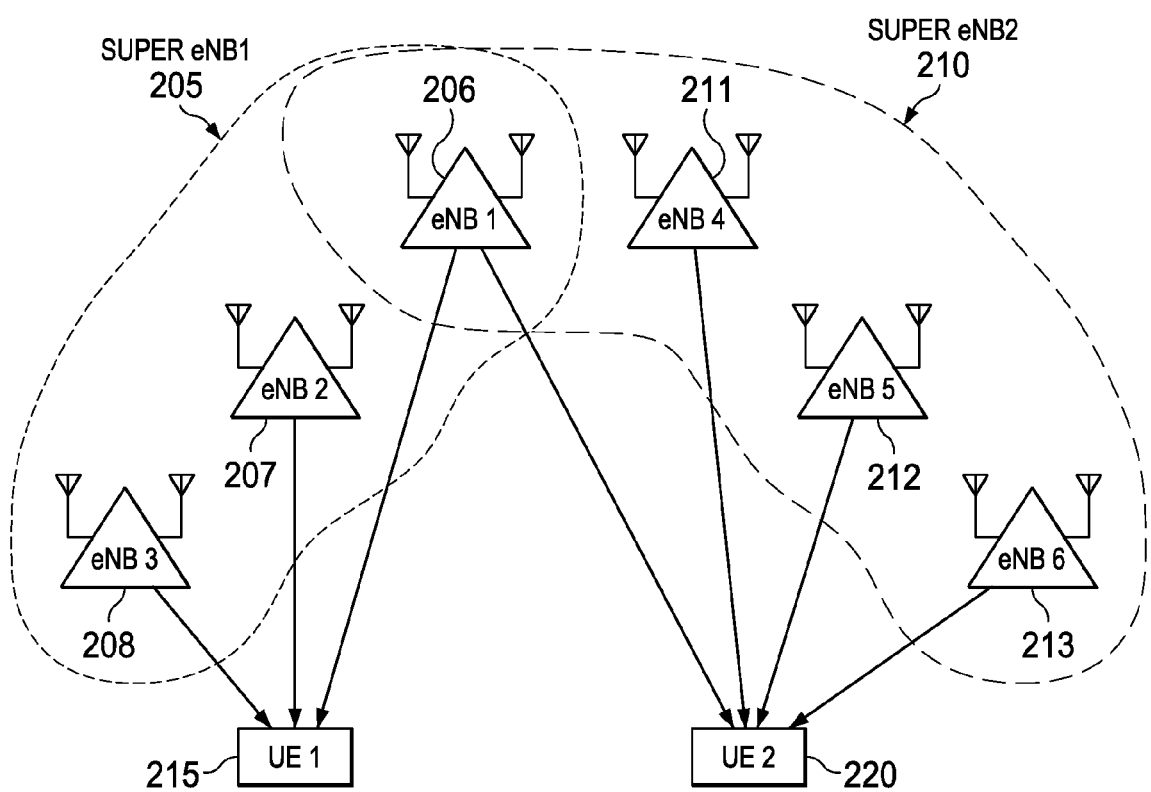
FIG. 2 illustrates a more general example of a network MIMO constructed according to the principles of the present disclosure.

FIG. 2 illustrates a more general example of a network MIMO 200 constructed according to the principles of the present disclosure. The network MIMO 200 includes first and second super-cells 205, 210, and first and second user equipment (UE) 215, 220. The first super-cell 205 employs a first cluster or set of eNBs (i.e., a "super eNB") that includes first, second and third eNBs 206, 207, 208. Correspondingly, the second super-cell 210 employs a second cluster or set of eNBs that includes the first eNB 106 and fourth, fifth and sixth eNBs 211, 212, 213.

As seen in FIG. 2, the number of eNBs associated with each super eNB can be different. Additionally, it is possible to configure the number and indices of eNBs associated with each super eNB based on network topologies, which may include for example, cell size or traffic type (i.e., highly-loaded cells versus lowly-loaded cells).

The set of eNBs associated with each super eNB may be semi-statically configured by a network higher-layer. Although it is possible to configure the super eNB dynamically, this may serve to limit performance compared to semi-static configuring. Furthermore, from the perspective of reducing the signaling overhead and configuration complexity in physical layer and backhaul areas, a semi-static configuring of the super-eNB may be generally sufficient and therefore appropriate.

The super eNB may be configured to function when the same channel state information is available at each of the individual eNBs, such as through a central controller. Alternatively, the super eNB may be configured to function when channel state information is not generally available at all individual eNBs. In this case, the super eNB functions more like multiple "distributed" eNBs.

The individual eNBs associated with a super eNB may send the same data to a target UE (e.g., the first or second UE 215, 220). Alternatively, different eNBs may send different data to the target UE. In general, there may be some degree of overlap across the data sent from a set of eNBs associated with different cells to the target UE.

A super-cell may consist of only one cell as a conventional cell. One possible example is in a rural area with a large cell and few users in the cell, where the network is not interference limited and thereby non-network, MIMO-based technology works well.

Figure 3A:
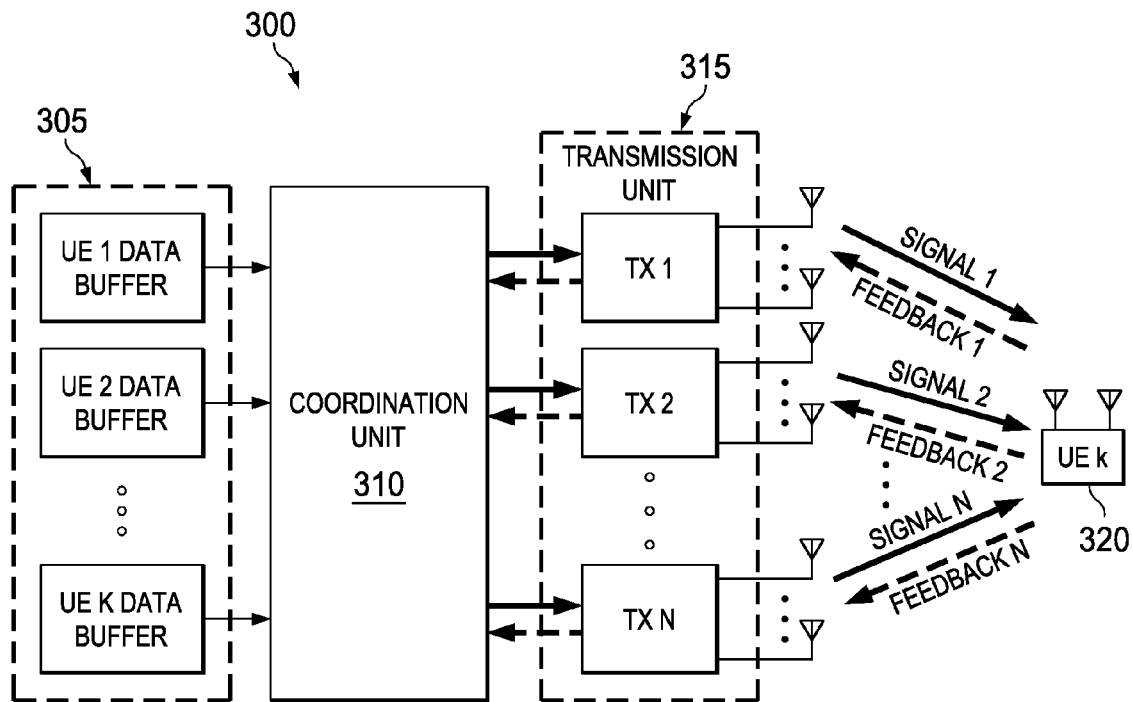
FIGS. 3A and 3B illustrate diagrams of a coordinated multipoint (COMP) transmitter 300 as may be employed as a super eNB of a super-cell, and a coordinated transmission receiver 350 as may be employed in the super-cell.
Figure 3B:
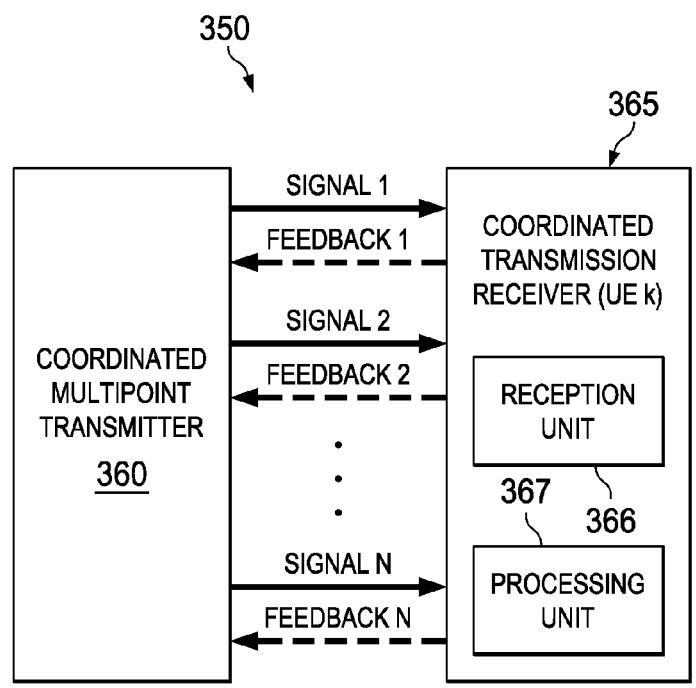

FIGS. 3A and 3B illustrate diagrams of a coordinated multipoint (COMP) transmitter 300 as may be employed as a super eNB of a super-cell, and a coordinated transmission receiver 350 as may be employed in the super-cell. The COMP transmitter 300 includes a plurality of data buffers 305 corresponding to a plurality of user equipment (UE), a coordination unit 310, a transmission unit 315 and a target $UE_k$ 320. The transmission unit 315 includes a set of N transmit units $TX_1$-$TX_N$, which may be associated with $x \leq N$ eNBs. The coordinated transmission receiver 350 includes a reception unit 366 and a processing unit 367.

The coordination unit 310 is configured to provide joint link processing to coordinate a multipoint transmission corresponding to a set of transmission points. The transmission unit 315 is configured to transmit the multipoint transmission using the set of transmission points. The reception unit 366 is configured to receive a multipoint transmission corresponding to a set of transmission points, and the processing unit 367 is configured to process the multipoint transmission from the set of transmission points. The multipoint transmission corresponds to geographically separated or co-located transmission points wherein a transmission point may be a base station transmitter, an enhanced base station (eNB) transmitter, a distributed antenna or a radio remote head (RRH), for example.

In the illustrated embodiment, each transmission unit 315 may be associated with a cell. For example, a three-cell site, where the cells are formed by sectorization beams, may form a three-cell super-cell associated with a single eNB. Alternatively, three single-cell sites may form a three-cell super-cell consisting of three eNBs.

For a given resource block (RB), a UE may receive a transmission from a total of $N_{TX}$ transmit units, where $N_{TX} \in \{0, 1, 2, \ldots, N\}$. Within a given cell, each RB is assigned to only one UE, for single-user MIMO. The UE may report a set of feedback parameters to the super-cell. Similarly, the UE may report to $N_{FB}$ transmitters, where $N_{FB} \in \{1, 2, \ldots, N\}$. The feedback parameters may include a channel quality indicator (CQI), a precoding matrix indicator (PMI), and a rank indicator (RI).

The number of transmit antennas for a transmit unit $TX_N$ may be denoted as $P_n$ and the number of UE antennas as Q. Hence, the maximum number of transmission layers from the COMP transmitter 300 (super-cell) to the UE is $$\min\left(Q, \sum_{n=1}^{N} P_n\right).$$

A joint transmission scheme, generally based on the above characteristics, involving UE reporting strategy and joint scheduling or link adaptation are addressed below.

Within a given RB, an idealized transmission to a UE of interest may involve the following capabilities. A super-cell may dynamically adapt the subset of $N_{TX} \in \{0, 1, 2, \ldots, N\}$ taken from the N available transmitters to optimize the average throughput across all N cells based on an instantaneous channel. This adaptation is necessary for optimality since generally receiving transmissions from all N transmitters is sub-optimal when channels associated with some of the transmitters are poor. Hence, such transmitters may better serve some other UEs. There are $2^N$ possibilities.

The super-cell is able to perform joint precoding, rank adaptation and MCS selection involving all the selected $N_{TX}$ transmitters or cells. Hence, a joint codebook is needed for all the possible dimensions. The UE receives a single joint transmission rather than several individual transmissions. Therefore, a UE receiver processes the single joint transmission in the symbol-level (thereby attaining symbol-level combining gain).

To enable the above capabilities, the UE reports the joint {CQI,PMI,RI} to the super-cell for each of the $2^N-1$ possible combinations of transmitters (cells) involving $N_{FB} \in \{1, 2, \ldots, N\}$. Denoting the subset of all possible transmitter combinations as $S \in \{S_1, S_2, \ldots, S_{2^N-1}\}$ and the joint report corresponding to transmitter combination $S_i$ as $\Gamma(S_i)$ (consisting of CQI, PMI, and RI associated with the joint transmission), the UE reports $\{\Gamma(S_1), \Gamma(S_2), \ldots, \Gamma(S_{2^N-1})\}$. Here, $S_1$ is defined as the subset containing only the first transmitter and $S_{2^N-1}$ as the full set containing all the N transmitters.

Correspondingly, $\Gamma(S_i)$ assumes that all the transmitters in the subset $S_i$ are signal sources, while the other transmitters ($\{1, 2, \ldots, N\} - S_i$) as well as other transmitters within the network (but not in the super-cell) are interference sources. Alternatively, the UE may feed back the DL channel coefficients associated with all the N links. This idealized approach requires what may be an excessive amount of UE reporting. Note that this limitation may not exist for TDD, since channel reciprocity can be exploited. However, the uplink-downlink (UL-DL) calibration issue may need to be resolved.

Since the idealized approach may prove to be impractical due to an excessive amount of UE feedback, several other approaches are also presented. It is first noted that reporting an individual CQI/PMI/RI to each of the transmitters assuming a single-cell transmission (the target cell as signal source and the other cells as interference sources) is inefficient in supporting a coordinated or joint transmission. The reasons are as follows.

In general, the CQI corresponding to the joint transmission cannot be derived from the individual CQIs. Note that CQI is a recommended MCS. Since the individual CQIs represent different MCSs, it is unclear how to translate such different MCSs into a single recommended MCS which corresponds to the joint transmission.

It is possible for several transmitters to transmit the same data but with different MCSs (corresponding to the CQIs) and different RB assignments. This, however, necessitates bit-level combining which is less efficient. Moreover, it negates data multiplexing across different transmitters (e.g. transmitting different codewords via different transmitters). Lastly, this simply provides gain in terms of BLER, but not in terms of data rate. Hence, the overall system-level gain may be limited, which defeats the purpose of a coordinated transmission. Elements of a more optimum solution corresponding to a semi-static configuration of $\overline{S}_i$ and reporting $\Gamma(\overline{S}_i)$ are described below.

Since the optimum subset of participating transmitters $\overline{S}_i$ typically does not change rapidly, it is possible to semi-statically configure $\overline{S}_i$ based on some long-term channel statistics such as shadowing or path-loss. Such configuration may typically be UE-specific since the optimum subset mainly depends on the UE position relative to the transmitters and transmission scatterers. The configuration may be accomplished via higher-layer signaling (e.g., RRC-level).

One possible scheme for selecting $\overline{S}_i$ is based on comparing the geometry associated with all the N different transmitters or cells and applying a certain threshold to select the subset $\overline{S}_i$. Some other long-term metrics are also possible. The threshold is essentially a network implementation choice. Once $\overline{S}_i$ is configured, the UE only reports $\Gamma(\overline{S}_i)$ to the super-cell, and the super-cell schedules a joint transmission based on $\Gamma(\overline{S}_i)$.

The UE may report $\Gamma(\overline{S}_i)$ to all the cells within the subset $\overline{S}_i$. Alternatively, the UE may report only to the serving cell or the cell with the highest SINR since the report will be communicated to the super-cell "controller". This preserves the UL control resource across all the participating cells.

Instead of configuring each UE for one subset $\overline{S}_i$, it is also possible for the network to semi-statically configure a particular UE for n>1 subsets $\{\overline{S}_{i(1)}, \ldots \overline{S}_{i(n)}\}$ where n is significantly smaller than $2^N-1$. This added flexibility allows the super-cell to further improve the performance (reduce the loss of performance due to semi-static configuration) or more flexibility due to the change in load and data traffic conditions.

The UE reports $\{\Gamma(\overline{S}_{i(1)}), \ldots, \Gamma(\overline{S}_{i(n)})\}$ to the super-cell. Based on the reports, the super-cell controller decides which of the n subsets is to be used for the UE. This may need to be signaled dynamically, that is, via a DL grant on the control channel.

A joint link adaptation may be performed based on the UE feedback $\Gamma(\overline{S}_i)$, which includes CQI (recommended MCS), PMI, and RI. Essentially, the link adaptation is performed assuming a composite MIMO system with $$P = \sum_{n \in \overline{S}_i} P_n$$

transmit antennas and Q receive antennas. The maximum number of transmission layers (rank) is $$\min\left(Q, \sum_{n \in \overline{S}_i} P_n\right).$$

Based on CQI and RI, the super-cell controller determines the number of transport blocks and transport block size (TBS) for each of the codewords.

The CQI provides a recommended MCS for joint transmission, and the composite RI report indicates the total rank R associated with the joint transmission. Note that the reporting individual RI associated with each transmitter $\{R_1, R_2, \ldots, R_{N_{TX}}\}$ is not compatible with the joint transmission approach unless different transmitters are configured to transmit different layers (i.e. no layer is transmitted from more than one transmitter). This restriction, however, may be too restrictive since it generally voids some of the potential joint precoding gain. Since one particular layer can be transmitted via one or multiple transmitters, $$\sum_{n=1}^{N_{TX}} R_i \geq R$$

where the equality holds if each layer is transmitted via only one transmitter.

The precoding may be done based on the PMI report. The PMI construct largely depends on the precoding matrix and codebook structure. The super-cell precoding matrix can be written as $$V = \begin{bmatrix} \sqrt{\rho_1}\, V_1 \\ \sqrt{\rho_2}\, V_2 \\ \vdots \\ \sqrt{\rho_{N_{TX}}}\, V_{N_{TX}} \end{bmatrix}, \quad (1)$$

where $V_i$ is $P_i \times R$ and $\text{Tr}(V_i V_i^H)=1$. Here, $\rho_i$ denotes the power allocated to the transmission via the i-th transmitter, and V is taken from the composite (super-cell) codebook $\Theta_F$.

While $V_1, V_2, \ldots, V_{N_{TX}}$ may in general be taken from different smaller single-cell codebooks $$\left( \Theta_F = \prod_{i=1}^{N_{TX}} \Theta_{S,i} \right),$$

it seems reasonable to use the same single-cell codebook for different cells $(\Theta_F = (\Theta_S)^{N_{TX}})$. In this case, the composite (super-cell) PMI may consist of $N_{TX}$ indices where each index is associated with one transmitter or cell and an index to the single-cell codebook.

Alternatively, it is possible to design the composite (super-cell) codebook without requiring that $V_i$ belongs to a particular codebook. As mentioned above, it is also possible to further restrict the precoder if different transmitters are set up to transmit different layers. This is only applicable when the number of UE antennas Q is sufficiently large: $Q \geq N_{TX}$ (when the equality holds, each of the transmitters transmits only one distinct layer to the UE).

In this case, the above super-cell precoder is reduced to a block diagonal form below since most of the elements are zero, $$V = \begin{bmatrix} \sqrt{\rho_1}\, \tilde{V}_1 & & & \\ & \sqrt{\rho_2}\, \tilde{V}_2 & & \\ & & \ddots & \\ & & & \sqrt{\rho_{N_{TX}}}\, \tilde{V}_{N_{TX}} \end{bmatrix}, \quad (2)$$

where $\tilde{V}_i$ is $P_i \times R_i$. In this case, the individual RI associated with each transmitter $\{R_1, R_2, \ldots, R_{N_{TX}}\}$ can be reported instead of the total rank R. This is because $$\sum_{n=1}^{N_{TX}} R_i = R.$$

Power balancing across antenna ports belonging to each transmitter can be enforced. This implies that $\|[V_i]_{j,:}\|=1$, and for $P_i \geq R$, it is sufficient to ensure that each $V_i$ has a constant modulus property.

With respect to processing requirements, Table 1 below outlines two possible approaches for cooperative transmission, which are super-cell controller oriented and eNB oriented. In both cases, UE scheduling (which requires UE feedback processing) and TBS generation are required to be performed at the super-cell controller. The two approaches in Table 1 are essentially the two extremes. For instance, it is possible to design the super-cell controller to perform channel coding and rate matching (RM). That is, all the bit-level processing is performed at the super-cell controller.

TABLE 1

| Aspect | Super-Cell Controller Oriented | eNB Oriented |
|---|---|---|
| Super-Cell Controller | Scheduling, TBS Generation, Channel | Scheduling, TBS Generation, Bit |

TABLE 1-continued

| Aspect | Super-Cell Controller Oriented | eNB Oriented |
|---|---|---|
| Processing | Coding & RM, Symbol Mapping, Codeword-to-Layer Mapping, Precoding, Symbol Multiplexing to different eNBs | Multiplexing to Different Transmitters (eNBs) |
| Transmitter (eNB) Processing | Transmit | Channel coding & RM, symbol mapping, Codeword-to-Layer Mapping, Precoding, Transmit |
| Performance | Expected better overall. | Expected worse due to a more constrained codebook. |
| Complexity | Super-cell controller has higher complexity since it has to perform channel coding, precoding in addition to scheduling and TBS generation, i.e., perform typical eNB operation in a higher scale. Avoids replication of some operations in the eNBs. | Super-cell controller has lower complexity (bit-level processing). Reply on replication of some operations in the eNBs. |

With continued reference to FIGS. 1, 2 and 3, some aspects of control signaling for network MIMO precoding will be addressed. Assume that there is a super eNB which is composed of N cooperating eNBs where the k-th eNB has $M_{i,k}$ antennas and K UEs where the k-th UE has $M_{i,k}$ receive antennas, which may be called a heterogeneous network. The N eNBs jointly design the signal to multiple UEs. In this discussion, only a single user case will be considered. That is, only a single UE is supported at one specific RB and at the specific time by N eNBs.

Two types of network MIMO precoding are considered in the following, wherein without loss of generally, a super eNB composed of N eNBs is employed. First consider joint multi-cell precoding. For a particular super eNB, the associated N multiple eNBs are bundled together to form a MIMO transmitter of size $$\sum_{k=1}^{N} M_{t,k},$$

where $M_{t,k}$ is the number to transmit antennas on the k-th eNB. The bundled size $$\sum_{k=1}^{N} M_{t,k}$$

MIMO array is administrated by a centralized scheduler to jointly perform downlink precoding. A single codebook is designed offline and known a priori to both eNBs and UEs, which may contain multiple fixed-rank codebooks of different ranks. The rank-r codebook consists of a set of size $$\left(\sum_{k=1}^{N} M_{t,k}\right) \times r$$

matrices, where any matrix in this set is a precoding matrix.

A UE performs rank adaptation to select a single preferred rank r for the downlink system bandwidth. Additionally, from the rank-r codebook, the UE chooses a single precoding matrix (wideband precoding) or multiple precoding matrices (frequency-selective precoding), and reports the precoding matrix indicators (PMIs) (i.e., the index to the selected precoding matrices in the rank-r codebook) to the eNBs. The eNBs decode the reported rank and PMIs, and apply the according precoding matrices as the downlink precoders on the bundled size $$\sum_{k=1}^{N} M_{t,k}$$

MIMO array.

Next, consider concatenated multi-cell precoding employing a multiple single-cell codebook known to the system, wherein each is a single-cell codebook corresponding to a particular eNB in the super eNB. The codebook corresponding to the k-th eNB consists of multiple fixed-rank codebooks, where a rank-r codebook contains a set of $M_{t,k} \times r$ matrices. For the k-th eNB, rank and precoding matrix adaptation is performed in the single-cell codebook corresponding to the k-th eNB, where a UE reports a preferred rank ($r_k$) and correspondingly one or multiple preferred precoding matrices from the rank-$r_k$ codebook of the k-th eNB. The preferred rank $r_k$, $1 \leq k \leq N$ may be different for different eNBs. This RI/PMI information is reported to eNB(s) in the uplink. To perform downlink precoding, the k-th eNB uses the rank-$r_k$ precoding matrices in the single-cell codebook corresponding to the k-th eNB. The total number of data streams from the super eNB is less than or equal to $$\sum_{k=1}^{N} r_k.$$

Support of precoding related information in both uplink and downlink control signaling is required in network MIMO. After rank adaptation and precoding adaptation at a UE, the preferred rank indicator (RI) and precoding matrix indicator (PMI) is reported to the eNBs in the uplink control channel. Alternatively, RI/PMI may also be sent in the form of data in an uplink shared channel if necessary. Furthermore, CQI is also required to be reported to the eNBs (in either an uplink control channel or a shared channel) so that scheduling may be performed to assign the appropriate modulation and coding scheme in a downlink transmission.

The following embodiments of uplink control signaling related to network MIMO are noted. A UE reports control information to different eNBs for downlink data transmission to this UE from different eNBs. Control information refers to a collection of RI, PMIs and CQIs, related to all eNBs or a subset of eNBs. Control information reported in the uplink to different eNBs may be same or different. One eNB may receive control information corresponding to this particular eNB, or receive control information corresponding to this particular eNB as well as other eNBs associated with the same super eNB. Furthermore, one eNB (target eNB) may receive control information related to other eNBs in other super eNBs not containing the target eNB.

In one embodiment, the UE reports a single joint feedback or report, which corresponds to the channel state information (CSI) of all transmission points and will be used to determine the scheduling assignment for the DL coordinated transmission. The single joint feedback may be transmitted to a single transmission point (e.g. a base station with the strongest SNR), or to all transmission points involved in coordination. In another embodiment, the UE reports multiple disjoint feedback or reports, where the n-th disjoint feedback or report is associated with the CSI of the n-th transmission point and used to decide the scheduling assignment (e.g., rank, precoding, modulation and coding scheme) of the n-th transmission point. In addition, the disjoint feedback to the n-th transmission point may also be associated with the CSI of the k-th ($k \neq n$) transmission point (e.g., a correlation of channels between the UE and different base stations). Similarly, the multiple disjoint reports may be sent to a single transmission point (e.g., a base station with the strongest SNR) and forwarded to other transmission points via the backhaul/X2 network interface, or alternatively, the k-th disjoint report may be only sent to the k-th transmission point in the uplink feedback channel.

For required control information received and decoded at eNBs, each eNB may independently receive or decode the control information reported to only itself, and not receive or decode control information for other eNBs. Alternatively, it is possible for each eNB to perform joint detection or decoding of control information it receives, which includes control information to other eNBs as well. It is also possible for different eNBs to jointly decode the control information they receive, where the control information one eNB receives may or may not contain control information for other eNBs.

Regarding control information coding, control information (RI/PMI/CQI) to a particular eNB may be jointly or separately encoded. Control information (RI/PMI/CQI) to a different eNB may be jointly or separately encoded.

Regarding uplink feedback channels, control information (RI/PMI/CQI) to different eNBs may be transmitted to different eNBs in orthogonal resources with time division multiplexing (i.e. in different time instances), or frequency-division multiplexing (i.e., in a different frequency spectrum), or code-division multiplexing (i.e., in orthogonal spreading or cover sequences). Alternatively, control information to multiple eNBs may be transmitted to different eNBs at the same uplink control resources (e.g., a time, frequency or orthogonal code sequence). The following embodiments are examples for network MIMO related uplink control signaling.

In one embodiment, the super cell (composed of N transmission points) may be considered as a concatenated MIMO array with $$\sum_{k=1}^{N} M_{t,k}$$

transmit antennas. A single codebook (corresponding to a size $$\sum_{k=1}^{N} M_{t,k}$$

array) may be constructed for the super-cell, which may be defined as a joint multi-cell codebook. Consequently, coordinated transmission, link adaptation and UE feedback may operate similarly to a single-cell network with $$\sum_{k=1}^{N} M_{t,k}$$

antennas. With respect to joint multi-cell codebook design, a single RI for the entire system bandwidth may be reported to all eNBs in the super eNB. In addition, a UE may report the same set of PMIs to every eNB in the super eNB. The PMI feedback may include only one PMI (i.e., in the case of wideband precoding) or multiple PMIs (in the case of frequency-selective precoding), where each PMI is applied to a fraction of the system bandwidth. Each eNB in the corresponding super eNB decodes the same RI and PMI feedback. In addition, a UE reports multiple sets of CQI values, with the k-th set of CQI corresponding to the k-th eNB.

Figure 4A:
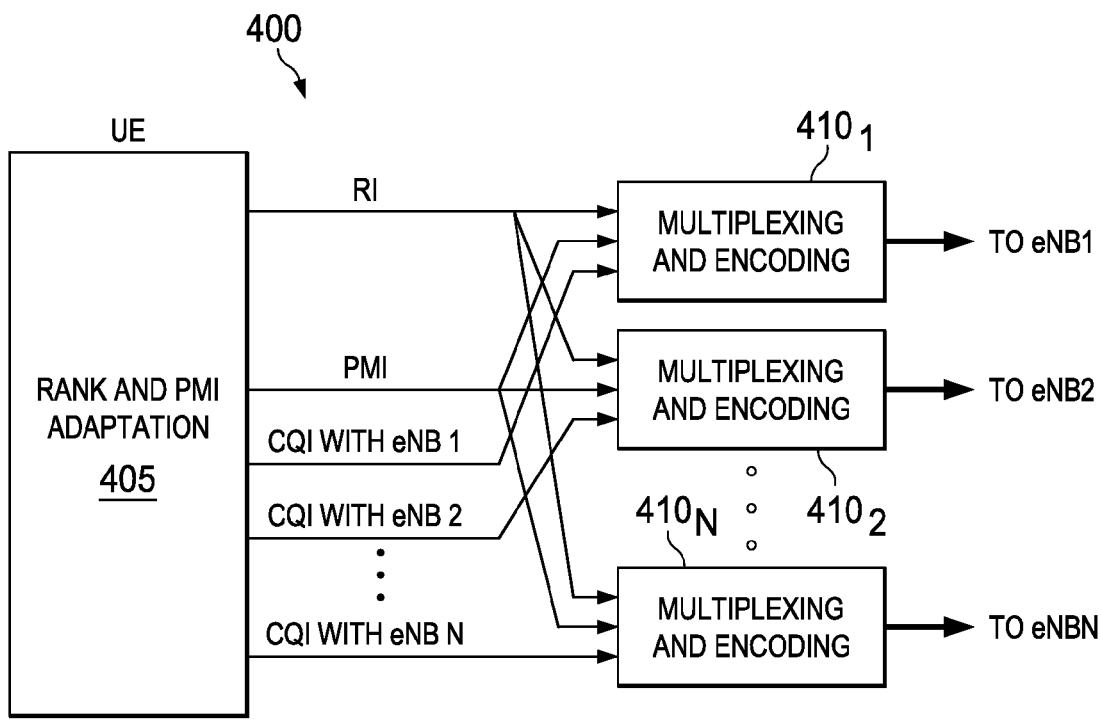
FIGS. 4A and 4B illustrate diagrams showing examples of feedback information routings from a UE to a super-eNB.
Figure 4B:
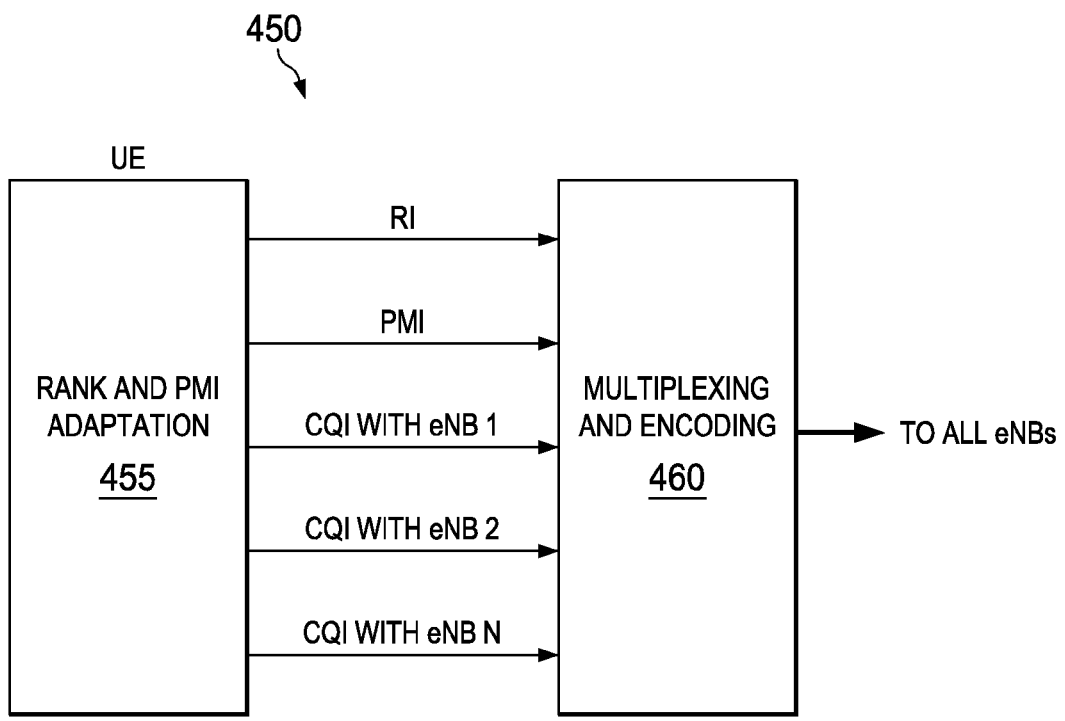

FIGS. 4A and 4B illustrate diagrams showing examples of feedback information routings 400 and 450 from a UE to a super-eNB. FIG. 4A includes a UE rank and PMI adaptation module 405 and a set of separate multiplexing and encoding modules $410_1$-$410_N$. FIG. 410B includes a UE rank and PMI adaptation module 455 and a single multiplexing and encoding module 460.

In the example shown in FIG. 4A, the feedback information routing 400 shows that RI, PMI and CQI quantities for different eNBs may be transmitted separately in orthogonal resources with time division multiplexing (i.e, in different time instances), or frequency-division multiplexing (i.e., in different frequency spectra), or code-division multiplexing (i.e., in orthogonal spreading or cover sequences). Each eNB only needs to decode the RI, PMI or CQI quantities pertaining to it, and not decode the RI, PMI or CQI quantities related to other eNBs.

Alternatively, in the example shown in FIG. 4B, the feedback information routing 450 shows that it is also possible to multiplex CQIs for different eNBs on the same uplink transmission resources (i.e., frequency, time or code). Each eNB will decode RI, PMI or CQI quantities pertaining to the entire super-eNB and then extract the information corresponding to it. CQI for $eNB_k$ may be separately or jointly encoded with RI or PMI.

In another embodiment, a UE feeds back N sets of disjoint feedback reports to N transmission points. Feedback associated with the n-th transmission point (e.g., a base station) may be used to decide the scheduling and transmission property for the n-th transmission point, assuming single-cell precoding with antennas. The n-th disjoint feedback associated with the n-th transmission point, which may include RI, PMI and CQI, may be different for different transmission points. In addition, it is possible to feedback an angular or phase offset between the disjoint feedback to different transmission points, in order to support coherent joint processing.

Figure 5A:
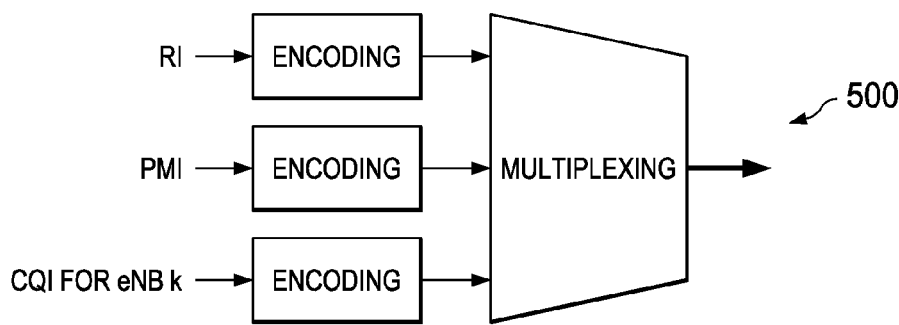
FIGS. 5A, 5B, 5C and 5D illustrate examples of CQI for $eNB_k$ encoding schemes.
Figure 5B:
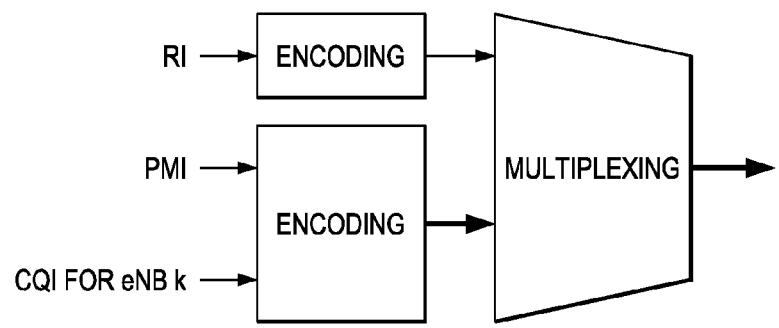
Figure 5C:
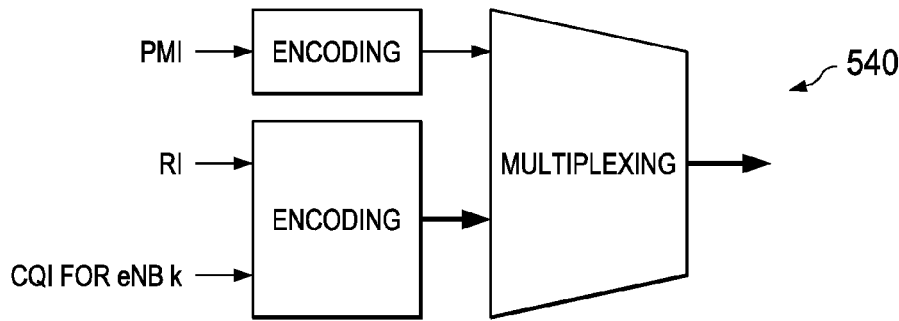
Figure 5D:
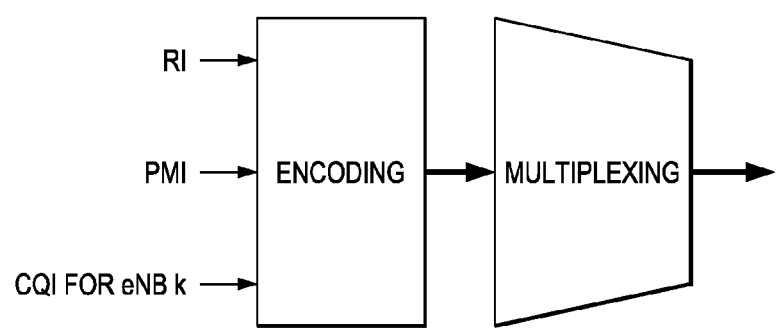

FIGS. 5A, 5B, 5C and 5D illustrate examples of CQI for $eNB_k$ encoding schemes. FIG. 5A shows an example 500 of RI, PMI and CQI for $eNB_k$ separately encoded before multiplexing. FIG. 5B shows an example 520 of RI separately encoded and PMI/CQI for $eNB_k$ jointly encoded before multiplexing. FIG. 5C shows an example 540 of PMI separately encoded and RI/CQI for $eNB_k$ jointly encoded before multiplexing. Lastly, FIG. 5D shows an example 560 of RI/PMI/CQI for $eNB_k$ jointly encoded before multiplexing.

Although joint encoding of CQI and RI may increase the coding gain slightly, the performance improve may be small. Furthermore, since the amount of CQI feedback is dependent on the RI report, to avoid the need of blind decoding, it is more effective to encode CQI separately from RI. In like manner, RI and PMI may be either separately or jointly encoded.

Figure 6A:
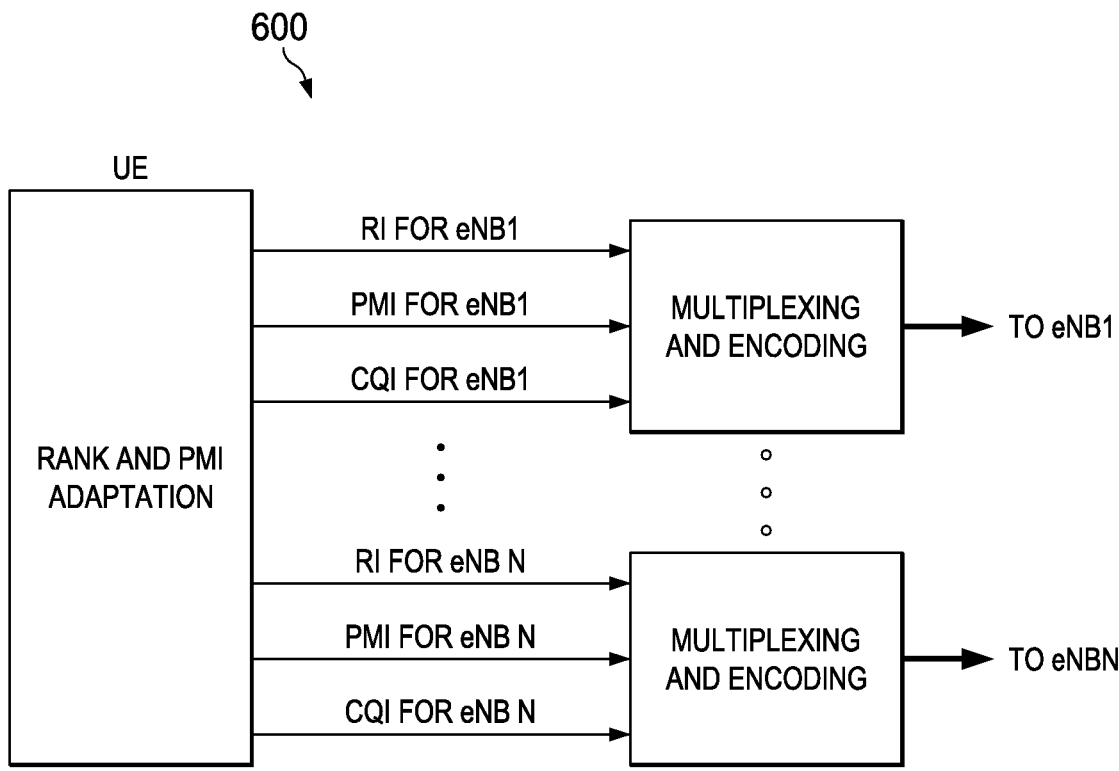
FIGS. 6A and 6B illustrate diagrams showing examples of feedback information schemes from a UE to a super-eNB with respect to concatenated multi-cell preceding.
Figure 6B:
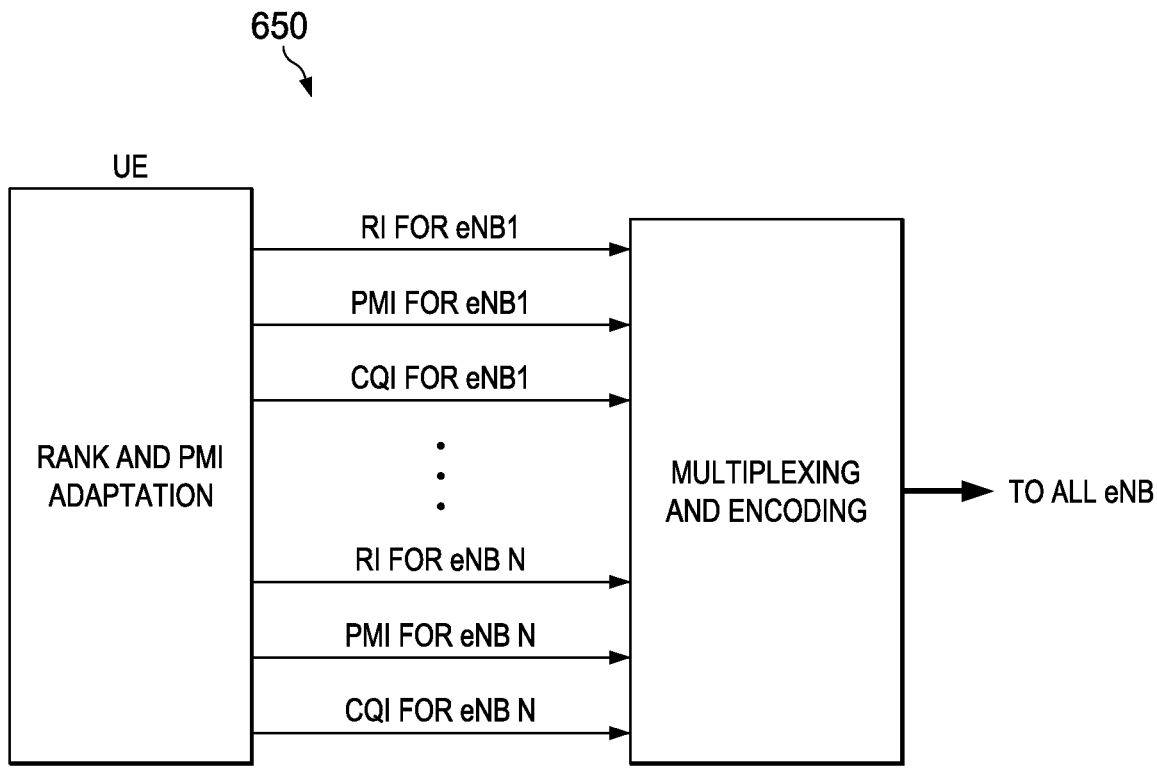

FIGS. 6A and 6B illustrate diagrams showing examples of feedback information schemes 600 and 650 from a UE to a super-eNB with respect to concatenated multi-cell precoding. A UE reports multiple RIs in the uplink feedback, where each RI report corresponds to a single eNB in the super-eNB. The value of RIs to different eNBs may be different (in case a different number of data streams are assigned to different eNBs) or identical (in case the same number of data streams are assigned to different eNBs).

For every eNB, a UE also reports a set of PMIs, which will be used in downlink transmission. For every eNB, PMI feedback may include only one PMI (i.e., in the case of wideband precoding) or multiple PMIs (in the case of frequency-selective precoding) where each PMI is applied to a fraction of the system bandwidth.

In the example of feedback information scheme 600, RIs, PMIs and CQIs for different eNBs may be transmitted separately in orthogonal resources with time division multiplexing (i.e., in different time instances), or frequency-division multiplexing (i.e., in different frequency spectrum), or code-division multiplexing (i.e., in orthogonal spreading/cover sequences). Each eNB only needs to decode RI/PMI/CQI pertaining to it, and not decode RI, PMI or CQI related to other eNBs.

Alternatively, as seen in the example of feedback information scheme 650, it is also possible to multiplex CQIs for different eNBs on the same uplink transmission resources (i.e., frequency, time or code). Each eNB will decode the RI, PMI or CQIs pertaining to the entire super-eNB and then extract the information corresponding to it.

Figure 7A:
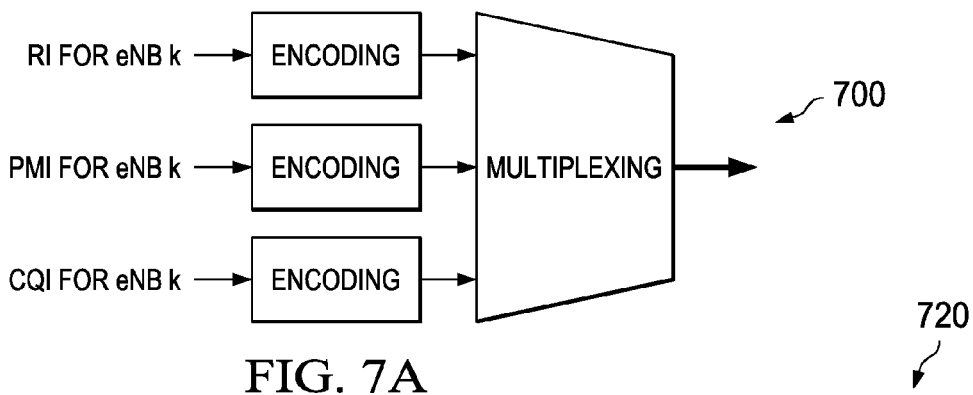
FIGS. 7A, 7B, 7C and 7D illustrate examples of RI, PMI and CQI encoding schemes.
Figure 7B:
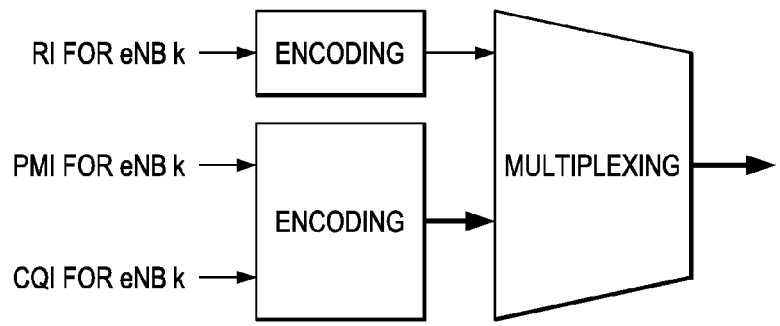
Figure 7C:
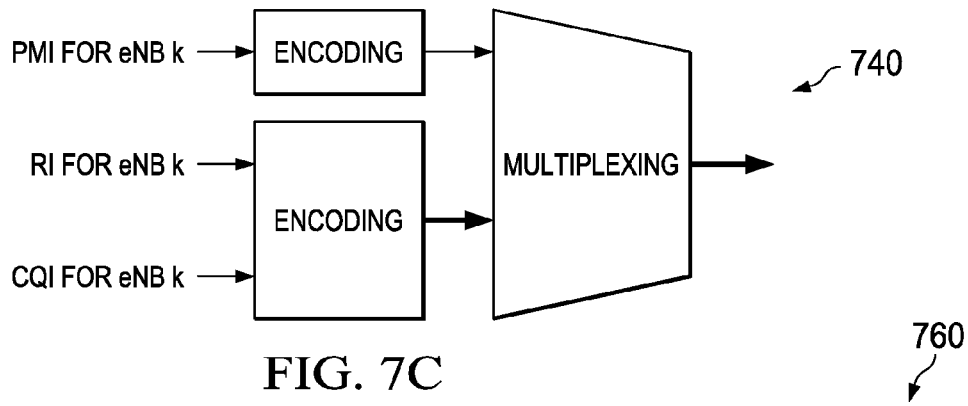
Figure 7D:
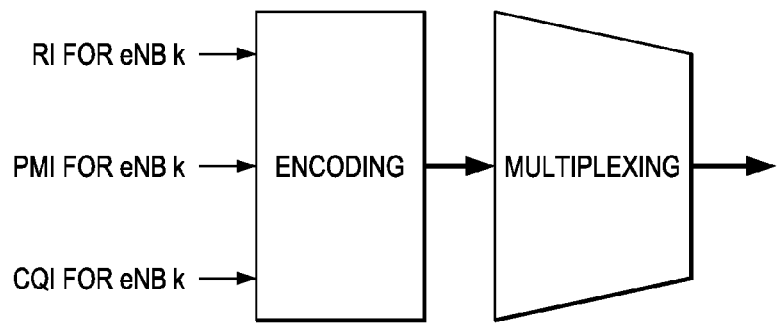

FIGS. 7A, 7B, 7C and 7D illustrate examples of RI, PMI and CQI encoding schemes. FIG. 7A shows an example 700 of RI for $eNB_k$, PMI for $eNB_k$ and CQI for $eNB_k$ separately encoded before multiplexing. FIG. 7B shows an example 720 of RI for $eNB_k$ separately encoded and PMI/CQI for $eNB_k$ jointly encoded before multiplexing. FIG. 7C shows an example 740 of PMI for $eNB_k$ separately encoded and RI/CQI for $eNB_k$ jointly encoded before multiplexing. Lastly, FIG. 7D shows an example 760 of RI/PMI/CQI for $eNB_k$ jointly encoded before multiplexing. As shown, CQI may be separately or jointly encoded with RI or PMI for an eNB. However, separate coding of CQI and RI may be preferred.

With continued reference to the above FIGUREs, some aspects of downlink control signaling for network MIMO will be addressed. Based on the reported RI, PMI or CQI from a UE, a scheduler needs to perform downlink scheduling and determines a bandwidth along with a modulation and coding scheme (MCS) a UE may be allocated in a downlink transmission. In certain cases, it is also necessary for the eNB(s) to overwrite the reported RI, PMI or CQI for the UE in case the eNBs consider such uplink reported information unreliable and determine to use a (pre-defined) default value instead. In either case, the selected RI, PMI or CQI is conveyed to the UE within downlink control signaling (e.g., a downlink grant), so that the UE can configure a corresponding receiver structure to successfully decode its signal.

The physical downlink control channel (PDCCH) is used to carry layer one and layer two control information including scheduling assignments for downlink data transmission from the eNBs to a UE. The scheduling assignments (DL grant) identify the UE, the frequency resources allocated for the UE's data reception, the MCS associated with the DL data, the rank and PMI associated with the downlink transmission and various parameters associated with the HARQ (e.g., process number, new data indicator, redundant version, etc).

In a conventional point-to-point communication network where DL data to a given UE is transmitted from a single eNB, the PDCCH carrying the DL grant associated with the DL data transmission is sent from the same single eNB. In the case of a multi-cell communication where multiple eNBs are involved in downlink data transmission to the UE, multiple PDCCH carrying downlink grants may be transmitted from multiple eNBs and appropriate modifications are required with respect to the PDCCH.

The following characteristics as outlined below for downlink control signaling in a super-eNB, network MIMO communication system are generally or specifically employed in embodiments of the present disclosure. It is noted that the following discussion on a downlink grant or scheduling assignment is associated with a single UE.

Multiple eNBs associated with the same super-eNB may transmit a single downlink grant or several downlink grants to the UE receiving downlink data. In case a single DL grant carrying scheduling information is transmitted to a UE, the DL grant may be transmitted from a single transmission point (e.g., an eNB) or multiple transmission points. In the case where a single DL grant is transmitted from a single eNB, the selection of the eNB may be fixed (e.g., the eNB with the highest SNR or the anchor eNB to which the UE is synchronized is always used for the DL grant transmission). Alternately, eNB switching may be performed to determine which eNB may be used for a DL grant transmission. The switching may be performed based on certain UE feedback information, such as the channel quality indicator, a path-loss measurement, or be semi-statically configured by a higher layer. The eNB switching may be UE-specific or cell-specific.

In the case where multiple DL grants are transmitted, the DL grants may be transmitted from every eNB associated with the super-eNB to the UE receiving downlink data. Alternatively, the DL grant(s) may be transmitted from a subset of n eNBs ($1 \leq n \leq N$) associated with the super-eNB where each eNB in the subset sends a downlink grant, whereas the remaining eNBs are refrained for DL grant transmission to this UE. The set of eNBs involved in the downlink grant transmission may be semi-statically configured by higher-layer signaling that is based on UE feedback information and may be UE-specific or cell-specific.

Downlink grants transmitted from different eNBs may carry the same scheduling assignment information. Such information is jointly detected at the UE to improve the diversity performance and reception reliability of the DL grants. On the other hand, it is not precluded to allow different eNBs to transmit a different downlink grant carrying different information related to the downlink assignment. Such information is then collectively combined at the UE to increase control channel capacity.

A combination of the above two approaches are also possible such that downlink grants from different eNBs may comprise identical scheduling assignment information (e.g., frequency resource allocation or HARQ related information), which are jointly decoded to obtain improved diversity or reliability performance, and meanwhile comprise different scheduling assignment information, which increase the downlink control signaling capacity.

A combination of the above approaches is also possible such that the eNBs are further divided into multiple groups, where eNBs in the same group transmit PDCCH carrying the same downlink assignment information, and different eNBs in different groups transmit different downlink assignment information. Such information is jointly detected and combined at a UE.

The network may semi-statically switch the DL grant transmission schemes among the above possibilities. That is, a single DL grant from a single eNB, multiple identical DL grants from multiple eNBs and multiple different DL grants from multiple eNBs are semi-statically configured.

A downlink grant transmitted from different eNBs may occupy different downlink transmission resources, such as different frequencies (e.g., resource blocks or control-channel elements), different time instances or subframes or different orthogonal spreading sequences to reduce co-channel interference. Alternatively, downlink grants from different eNBs may be transmitted over the same downlink transmission resources (i.e., frequency, time or orthogonal spreading sequences). A UE may listen to or decode all downlink grants or a subset of the downlink grants.

As each UE may experience a different signal-to-noise and interference ratio (SINR) in the DL transmission, the PDCCH transmission from the an eNB to a given UE may occur with a MCS that is appropriate for the corresponding SINR in order to achieve a target PDCCH block error rate (BLER). Furthermore, the payload size of a PDCCH may substantially vary because a DL transmission mode (e.g., space-time coding, spatial multiplexing or closed-loop or open-loop transmission) of the UE may be configured.

For these reasons, the PDCCH of different payloads associated with different MCS levels may vary significantly in terms of the amount of occupied downlink physical transmission resources (i.e., an aggregation level of a control-channel element). Because the UE has no apriori knowledge as to whether any PDCCH will be transmitted and what MCS or payload size the PDCCH may have, it needs to perform blind decoding of PDCCHs of different aggregation levels in different search spaces. This allows finding the downlink scheduling assignments in a corresponding search space, where a PDCCH of a particular aggregation level of control channel elements is transmitted.

As one UE may receive multiple PDCCHs transmitted from multiple eNBs, multiple search spaces may be defined such that each search space corresponds to a particular eNB. Every eNB transmits its PDCCH in its corresponding search space, and the UE performs blind decoding in each search space to look for the PDCCH from the corresponding eNB. Construction of a search space associated with a particular eNB may be based on the cell-specific parameters (e.g., cell ID). Furthermore, the search space corresponding to each eNB may be further divided into search spaces of smaller size corresponding to different aggregation levels.

Alternatively, it is possible to design one search space to accommodate the PDCCHs transmitted from all eNBs, and have the UE blindly decode all PDCCHs from all eNBs in this single search space. Note that this search space may be further divided into several smaller search spaces corresponding to different aggregation levels.

A PDCCH transmitted from different eNBs may be generated based on cell-specific parameters such that a UE may identify the source of the DL grant (e.g., an eNB index) upon successful decoding of the DL grant. For example, an eNB-specific scrambling may be applied to the CRC attachment of the PDCCH. Alternatively, the cell-ID may be explicitly included in the PDCCH payload.

In the network MIMO scenarios previously discussed for link adaptation, CQI, PMI and RI are reported from UEs to corresponding eNBs in a super-eNB. In the following, several additional approaches to reporting CQI, PMI and RI from UEs to super-eNBs are considered. Again, assume that there is a super-cell, which is composed of N cooperating cells. The N cells jointly or separately generate and transmit signals to multiple UEs. In this discussion, only a single user case is considered. That is, only a single UE is supported at one specific RB and at a specific time by N cells.

For full cell cooperation, assume that N cells cooperate to support a UE, and this network topology information is known to the UE. The UE receives signals from the eNBs associated with the N cells in a constructive way and the number of cells which cooperate in a super-cell does not change (i.e., they are statistically determined depending on the super-cell configuration). In this case, CQI, PMI or RI may be decided jointly using some performance metric (e.g., throughput) and the UE may report the CQI, PMI or RI to the nearest eNB through a backhaul network. Alternatively, the CQI, PMI or RI report may be received by all the eNBs within the super-cell and jointly processed in the backhaul network to enhance reliability.

Channel state information from all N cells is captured by the UE to constructively combine signals from the N cells and to jointly decided PMI and RI information. This channel information is concatenated for the joint selection of PMI and RI. The joint CQI information is also decided after the corresponding PMI/RI information is decided. If the system consists of N finite codebooks for N cells for precoding matrices, the n-th codebook is composed of $m_n$ codewords, and the n-th cell can support a transmission rank up to $r_n$. The number of calculations for selecting PMI/RI is $$O\left(\prod_{n=1}^{N} m_n r_n\right), \quad (3)$$

and the number of feedback bits for PMI/RI is $$\sum_{n=1}^{N} [\log_2 m_n + \log_2 r_n]. \quad (4)$$

The corresponding CQI calculated jointly by the PMI/RI may also be fed back from the UE to the nearest eNB or to all the eNBs within the super-cell for joint processing.

Figure 8:
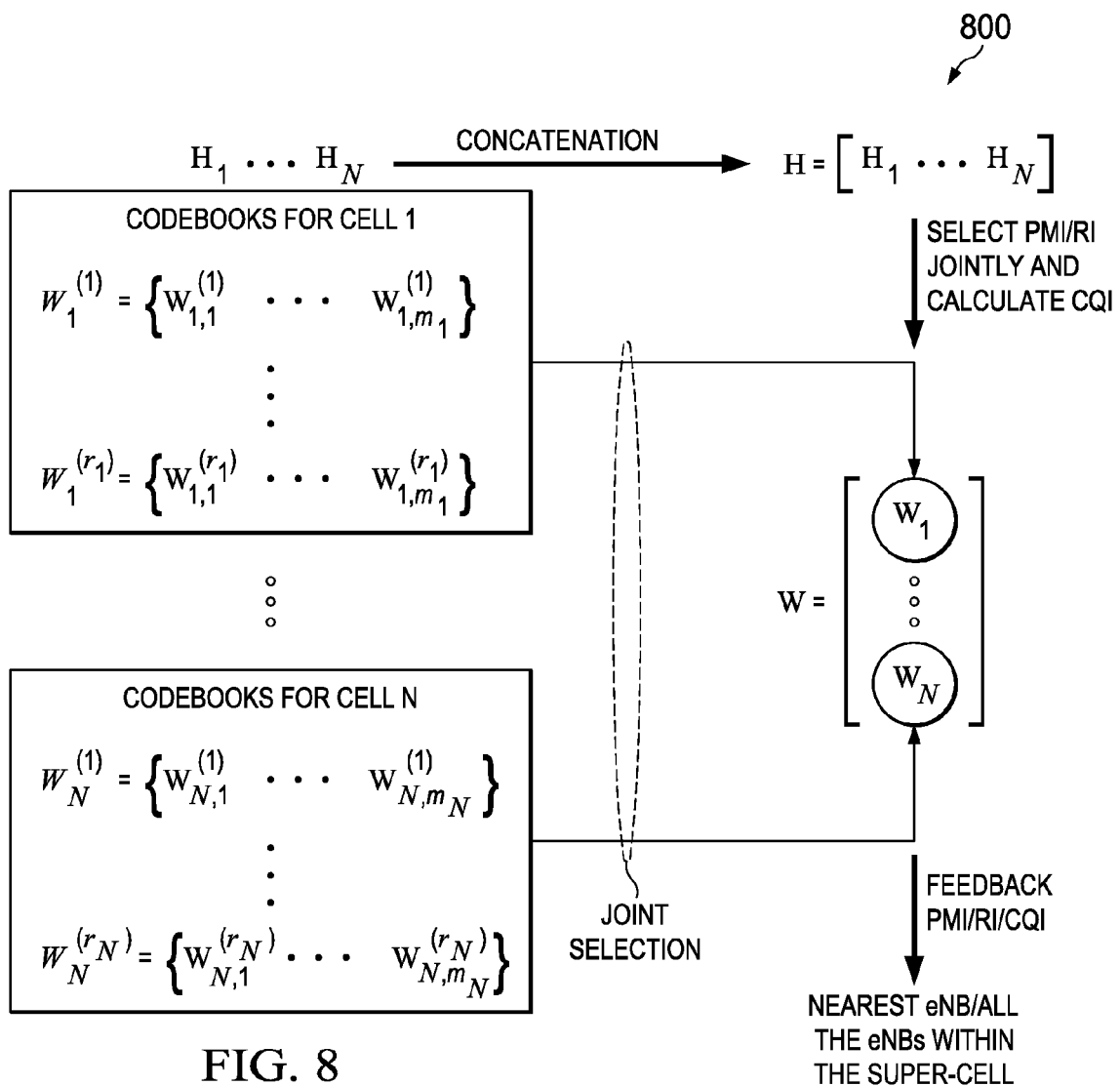
FIG. 8 illustrates a detailed procedure for joint CQI/PMI/RI feedback from a UE during full cell cooperation in a super-cell of eNBs.

FIG. 8 illustrates a detailed procedure 800 for joint CQI/PMI/RI feedback from a UE during full cell cooperation in a super-cell of eNBs. In FIG. 8, $H_i$ is channel information from the eNB associated with the i-th cell to the UE, and $W_i^{(j)}$ is a rank j codebook for the i-th cell. First, each channel $H_i$ is concatenated to make H, and based on this concatenated channel, the UE selects precoding matrix W that matches the concatenated channel H. The selection criterion may be throughput or BER, for example. In the precoding matrix W, $W_i$ comes from $W_i^{(j)}$ for some j. Then the computation cost is $$O\left(\prod_{n=1}^{N} (m_n \times r_n)\right).$$

If the number of $W_i$ columns does not match, appropriate zeros may be padded to construct W.

In essence, all the N cells always cooperate to transmit the signal to each of the scheduled UEs. Therefore, CQI/PMI/RI is calculated jointly across all the N cells assuming that the signals transmitted by the other cells within the super-cell are not treated as interference sources, but rather as signal sources. Since all the N cells transmit signals only to a particular UE within each resource block (RB), each UE cannot achieve the peak data rate. However, the gain in cell-edge throughput is expected to be large for this case. Note that the UE may experience weak channels from some of the eNBs. Due to the static configuration, the transmission from such eNBs cannot be muted. This results in some inefficiency as the resource (power and bandwidth) from such eNBs may be employed by other UEs.

A partial summary of characteristics of CQI/PMI/RI reporting related to full cell cooperation embodiments in a network MIMO are noted below, wherein a UE reports CQI/PMI/RI to the eNBs associated with N cells in a super-cell (N is a fixed number).

A UE receives a downlink data transmission from the eNBs associated with the N cells in the super-cell, where N is a fixed number. Additionally, regarding a CQI/PMI/RI report to the eNB associated with the n-th cell, n=1, ..., N. A CQI/PMI/RI report to the eNB associated with the n-th cell may include CQI/PMI/RI information corresponding to the link between the eNB associated with the n-th cell and the UE. Also, a CQI/PMI/RI report corresponding to the link between the eNB associated with the n-th cell and the UE is calculated by assuming that the links (e.g., channel or transmission) between the eNBs associated with the other N−1 cells and the UE are known and do not act as interference.

A CQI/PMI/RI corresponding to the link between the eNB associated with the n-th cell and the UE, where n=1, ..., N, may be combined at a particular cell, or at a subset of cells configured by higher layer, or at the RNC/backhaul. Such combined CQI/PMI/RI is then used for the downlink scheduling or transmission to the UE.

A CQI/PMI/RI report corresponding to the link between the eNB associated with the n-th cell and the UE may be used in the n-th cell for its scheduling or transmission to the UE. Such scheduling or transmission may be determined in the n-th cell, or jointly determined in a set of cells (including the n-th cell) configured in the super-cell. Additionally, the value of N, and the set of cells involved in CQI/PMI/RI report and downlink scheduling or transmission, may be configured by higher-layer. Such configuration may be static or semi-static.

Another PMI/RI/CQI feedback approach may employ separate eNB selection wherein the number of cooperating cells varies dynamically in a super-cell composed of N cells. For fast moving UEs, channel state information varies rapidly, and network topology may need to change dynamically based on the channel state information. At a specific time, the number of cooperating cells may be l(≦N), where the cooperating cells are $n_1, \ldots, n_l$. In this case, PMI/RI may be decided separately. That is, the UE selects the best PMI/RI for each cell considering signals from other cells as interference.

This seems appropriate since the number of cooperating cells l(≦N) is decided by the network for scheduling and transmission. This also avoids unnecessary transmissions from some cells to the UE (e.g., the cells where the UE experiences weak channels) thereby lowering data rate requirements. However, the UE cannot acquire this information during the CQI/PMI/RI computation. Assuming a certain number of cooperating cells may cause a mismatch between the CQI/PMI/RI and actual channel quality.

Using the same notation that was used before, the computation cost for the codeword selection is $$O\left(\sum_{l'=1}^{l} P_N^{l'} m_{n_{l'}} r_{n_{l'}}\right), \quad (5)$$

where $P_N^l$ is the permutation of l out of N cells and the number of feedback bits for the PMI/RI is $$\sum_{i'=1}^{l}\left[\log_2 m_{n_{i'}} + \log_2 r_{n_{i'}}\right]. \quad (6)$$

The corresponding CQI calculated jointly by the PMI/RI is also fed back from the UE to the nearest eNB or to all the eNBs within the super-cell. Another possibility is that CQI/PMI/RI corresponding to the n-th cell is always reported to the eNB associated with the n-th cell. As we mentioned above, the number of cooperating cells varies according to channel conditions for UE.

Figure 9:
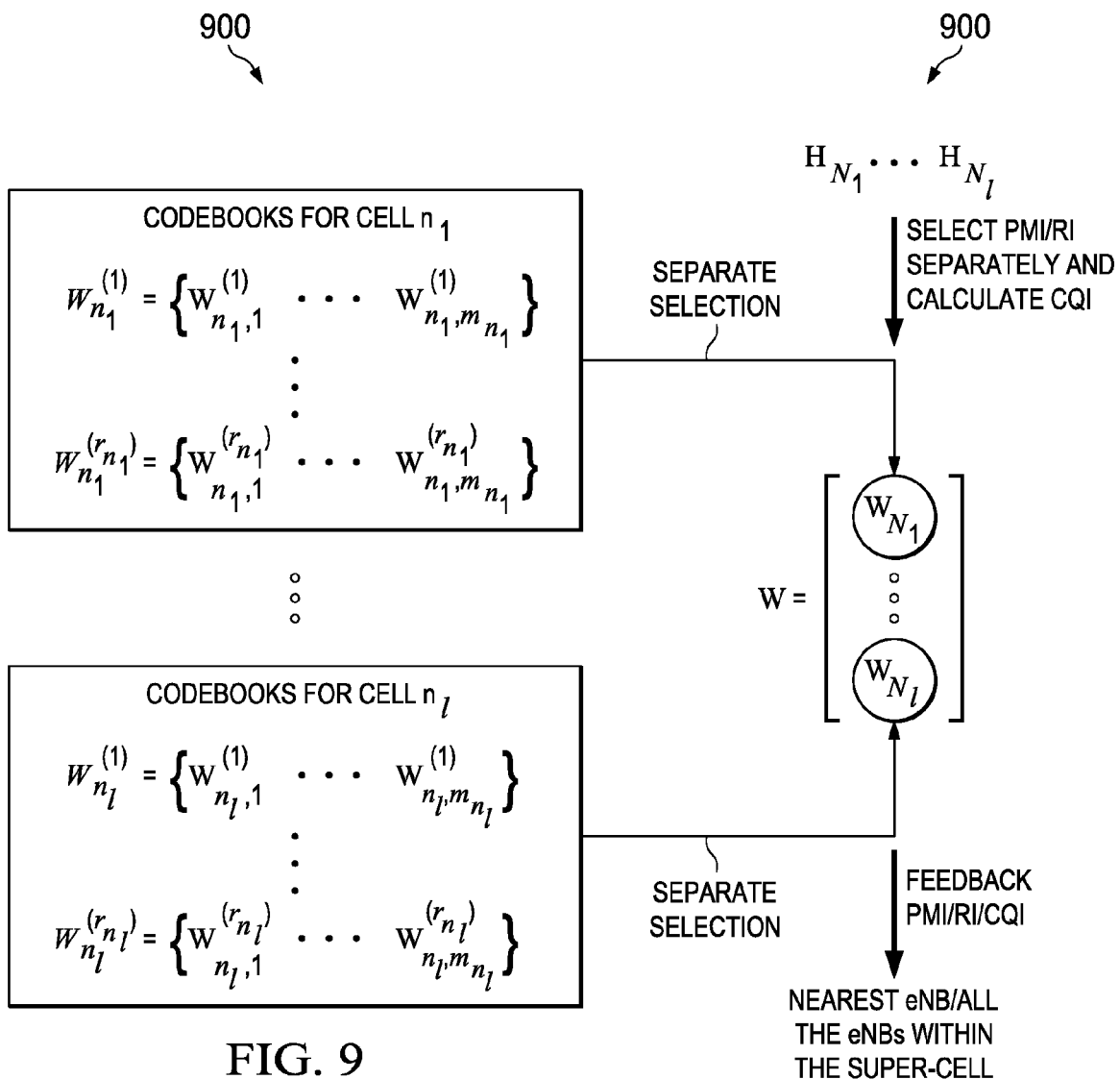
FIG. 9 illustrates a detailed procedure for separate PMI/RI selection and feedback of PMI/RI/CQI from a UE during dynamic cell cooperation in a super-cell of eNBs.

FIG. 9 illustrates a detailed procedure 900 for separate PMI/RI selection and feedback of PMI/RI/CQI from a UE during dynamic cell cooperation in a super-cell of eNBs. In FIG. 9 the UE selects the precoding matrix $W_{l'}$ that matches with the channel $H_{l'}$ for each $H_{l'}$ while considering signals from other cells as interference and where $W_{l'}$ can be selected from $W_{l'}^{(j)}$ for some j. The final precoding matrix W may be constructed from the concatenation of $W_{l'}$. If the number of $W_{l'}$ columns does not match, appropriate zeros may be padded to construct W.

A partial summary of characteristics of CQI/PMI/RI reporting related to dynamic cell cooperation embodiments in a network MIMO are noted below, wherein a UE reports CQI/PMI/RI to the eNBs associated with N cells in a super-cell. The UE receives a downlink data transmission from the eNBs associated with N in the super-cell. The eNBs associated with the N−1 non-cooperating cells do not schedule downlink transmission to this UE. In other words, signals from these N−1 non-cooperating cells are interference sources.

If $n_i$ is the index of the i-th cell in the set of N cells, then $n \in \Omega = \{n_1, \ldots, n_N\}$ for CQI/PMI/RI reports to an eNB associated with the n-th cell. CQI/PMI/RI reports to an eNB associated with the n-th cell may include CQI/PMI/RI information corresponding to the link between the eNB associated with the n-th cell and the UE. CQI/PMI/RI reports corresponding to the link between an eNB associated with the n-th cell and the UE is calculated by assuming that the N−1 links (e.g., channels and transmissions) between the eNBs associated with the other N−1 cells are unknown and treated as interference.

CQI/PMI/RI reports corresponding to the link between an eNB associated with the n-th cell and the UE, where n=1,..., N, may be combined at a particular cell, or at a subset of cells configured by a higher layer or at the RNC/backhaul network. Such combined CQI/PMI/RI reports may then be used for downlink scheduling or transmission to the UE. CQI/PMI/RI reports corresponding to the link between the eNB associated with the n-th cell and the UE may be used in the n-th cell for its scheduling or transmission to this UE. Such scheduling or transmission may be determined in the n-th cell, or jointly determined in a set of cells (including the n-th cell) in the super-cell.

A joint selection of PMI/RI for the entire N cells may require higher computational complexity and result in an operational penalty due to employing peak data rates than is practical. Another PMI/RI/CQI feedback approach wherein the number of cooperating cells is varied semi-statically (e.g., via higher layer signaling) is therefore attractive. The number of cooperating cells $\tilde{N} \leq N$ within the super-cell (consisting of N cells) can be decided using long-term statistics or UE location.

Especially, a UE may report its location to each of cells according to this information and a number of cooperating cells may be selected. This scheme may be more appropriate for slowly moving UEs since long-term channel information changes slowly over time.

Over a longer time period, the number of cooperating cells may need to change as the channel statistics of the UE varies. If the cells $n_1, \ldots, n_{\tilde{N}}(\tilde{N} \leq N)$ are used to cooperate, the computational cost is $$O\left(\prod_{\tilde{n}=1}^{\tilde{N}} m_{n_{\tilde{n}}} r_{n_{\tilde{n}}}\right), \quad (7)$$

and the number of feedback bits for the PMI/RI is $$\sum_{\tilde{n}=1}^{\tilde{N}}\left[\log_2 m_{n_{\tilde{n}}} + \log_2 r_{n_{\tilde{n}}}\right]. \quad (8)$$

The corresponding CQI calculated jointly by the PMI/RI is also transmitted from the UE to the nearest eNB or to all the cooperating eNBs within the super cell.

Figure 10:
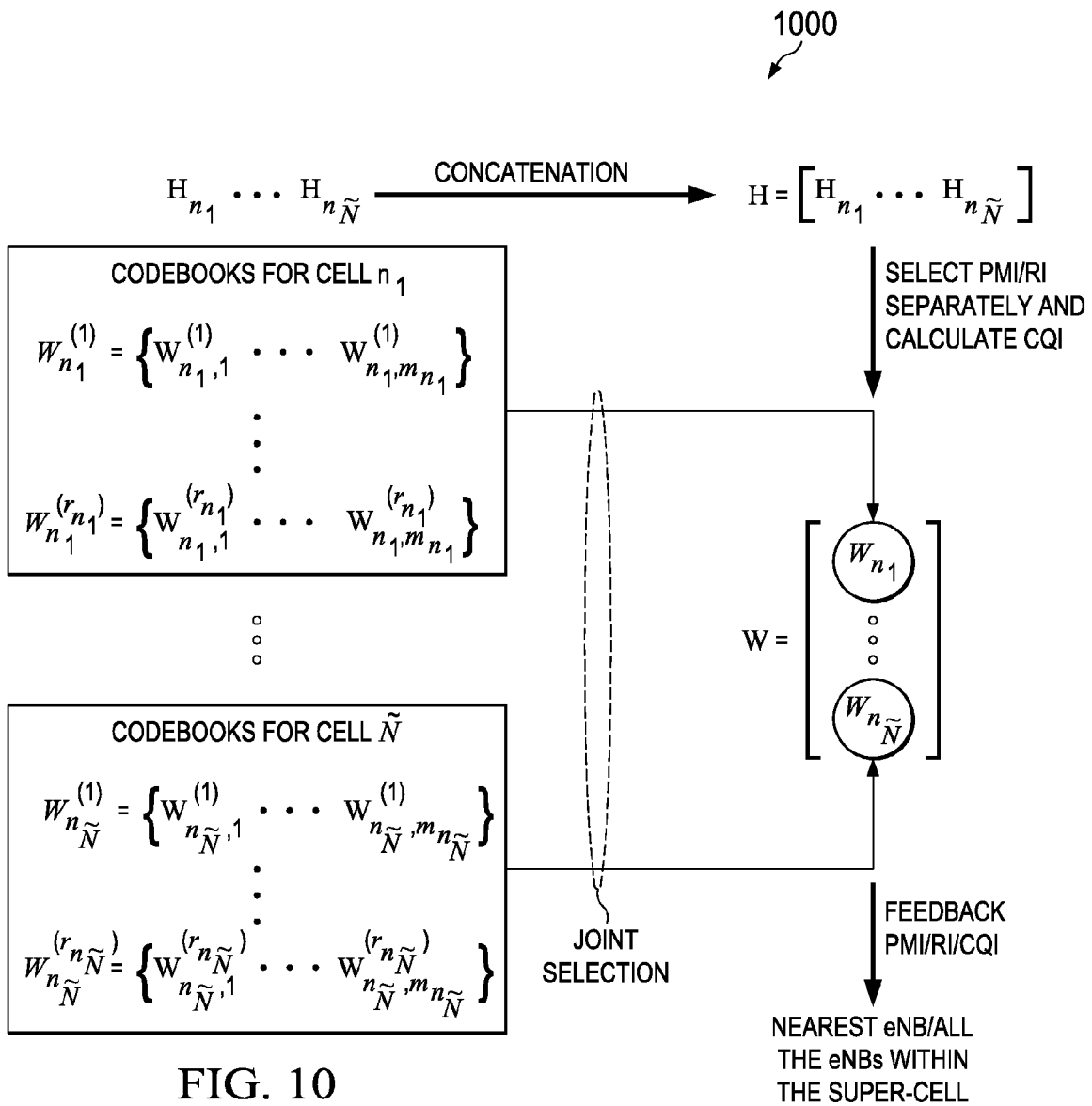
FIG. 10 illustrates a detailed procedure for joint CQI/PMI/RI feedback from a UE during semi-static cell cooperation in a super-cell of eNBs.

FIG. 10 illustrates a detailed procedure 1000 for joint CQI/PMI/RI feedback from a UE during semi-static cell cooperation in a super-cell of eNBs. FIG. 10 shows a detailed procedure for joint CQI/PMI/RI feedback. Each channel $H_{n_{\tilde{n}}}$ is concatenated to make H and based on this channel, the UE selects precoding matrix W that matches the concatenated channel H. The selection criterion may be throughput, BER, etc. In the precoding matrix W, $W_{n_{\tilde{n}}}$ comes from $W_{n_{\tilde{n}}}^{(j)}$ for some j. If the number of $W_l$ columns does not match, appropriate zeros may be padded to construct W.

In one embodiment of the disclosure, a set of cooperating cells $\Omega = \{n_l, \ldots, n_{\tilde{N}}\}$ is pre-determined (e.g., either pre-determined at the UE through UE measurements and reported to the eNBs, or configured by higher-layer and then signaled to the UE). The UE then performs joint PMI/CQI/RI computation assuming the signals from the cooperating $\tilde{N}$ cells are signal sources and the signals from the non-cooperating $N-\tilde{N}$ are treated as interference.

In another embodiment of the disclosure, only the value of $\tilde{N}$ is signaled to the UE from a higher-layer network. The UE then determines a set of cooperating cells $\Omega = \{n_l, \ldots n_{\tilde{N}}\}$ and reports this information to the eNBs. When computing the optimum set of cooperating cells, $\Omega = \{n_l, \ldots n_{\tilde{N}}\}$. Similarly, the UE performs joint PMI/CQI/RI computation assuming the signals from the cooperating $\tilde{N}$ cells are signal sources and the signals from the non-cooperating $N-\tilde{N}$ are treated as interference. This scheme circumvents some drawbacks of the previous two schemes, discussed directly above. The penalty afforded by employing a peak rate is removed for the UEs that are capable of receiving a near peak-rate transmission. At the same time, a joint CQI/PMI/RI may be employed, which results in a more optimum performance.

A partial summary of characteristics of CQI/PMI/RI reporting related to semi-static cell cooperation embodiments in a network MIMO are noted below, wherein a UE reports CQI/PMI/RI to the eNBs associated with N cells in a super-cell. The UE reports CQI/PMI/RI to the eNBs associated with $\tilde{N}$ cooperating cells in the super-cell and the UE receives downlink data transmission from the eNBs associated with the $\tilde{N}$ cooperating cells in the super-cell. The eNBs associated with the $N-\tilde{N}$ non-cooperating cells do not schedule downlink transmission to this UE. In other words, signals from the $N-\tilde{N}$ non-cooperating cells are interference to this UE.

Regarding CQI/PMI/RI reports to the eNB associated with the n-th cell, $n \in \Omega = \{n_I, \ldots n_{\tilde{N}}\}$, where $n_i$ is the index of the i-th cell in the set of $\tilde{N}$ cooperating cells. CQI/PMI/RI reports to the eNB associated with the n-th cell may include CQI/PMI/RI information corresponding to the link between the eNB associated with the n-th cell and the UE. CQI/PMI/RI reports corresponding to the link between the eNB associated with the n-th cell and the UE is calculated by assuming that the links (e.g., channels and transmission) between the eNBs associated with the other $\tilde{N}-1$ cooperating cells and the UE are known and do not act as interference. This assumes that the links (e.g., channels and transmission) between the remaining eNBs associated with the $N-\tilde{N}$ non-cooperating cells and the UE are unknown and act as interference.

CQI/PMI/RI reports corresponding to the link between the eNB associated with the n-th cell and the UE, where $n=1, \ldots, \tilde{N}$, may be combined at a particular cell, or at a subset of cells configured by higher layer, or at the RNC/backhaul. Such combined a CQI/PMI/RI report is then used for downlink scheduling/transmission to the UE. Additionally, CQI/PMI/RI reports corresponding to the link between the eNB associated with the n-th cell and the UE may be used in the n-th cell for its scheduling or transmission to the UE. Such scheduling or transmission may be determined in the n-th cell, or jointly in a set of cells (including the n-th cell) in the super-cell.

The set of $\tilde{N}$ cells $\Omega = \{n_I, \ldots n_{\tilde{N}}\}$ may be semi-statically configured by a higher-layer. Alternatively, $\Omega = \{n_I, \ldots n_{\tilde{N}}\}$ may be determined based on certain measurements (e.g., RSRP measurement) at the UE and reported in the uplink to the eNBs or super-cell. An uplink report of $\Omega = \{n_I, \ldots n_{\tilde{N}}\}$ may be periodic or aperiodic, (e.g., trigger-based). This report may be initiated by the UE based on its measurement of the channel (e.g., geometry, velocity), or the network may authorize the UE to start or terminate such a report.

With regard to further operational cooperating aspects, a UE may be configured to semi-statically switch between full cell cooperation, dynamic cell cooperation or semi-static cell cooperation modes. If semi-static cell cooperation is used, each of the UEs within the N-cell super-cell may be semi-statically configured with $\tilde{N} \leq N$ cells (e.g., via RRC signaling). This information may be a part of the UE-specific (dedicated) system information. An example of such signaling is the use of a UE-specific length-N bitmap which indicates which cell(s) within the N-cell super-cell are used for that particular UE. For instance, when N=3, the bitmap 101 indicates that the UE is semi-statically assigned cells one and three for cooperative transmission. This configuration is valid until the next update of system information.

Figure 11:
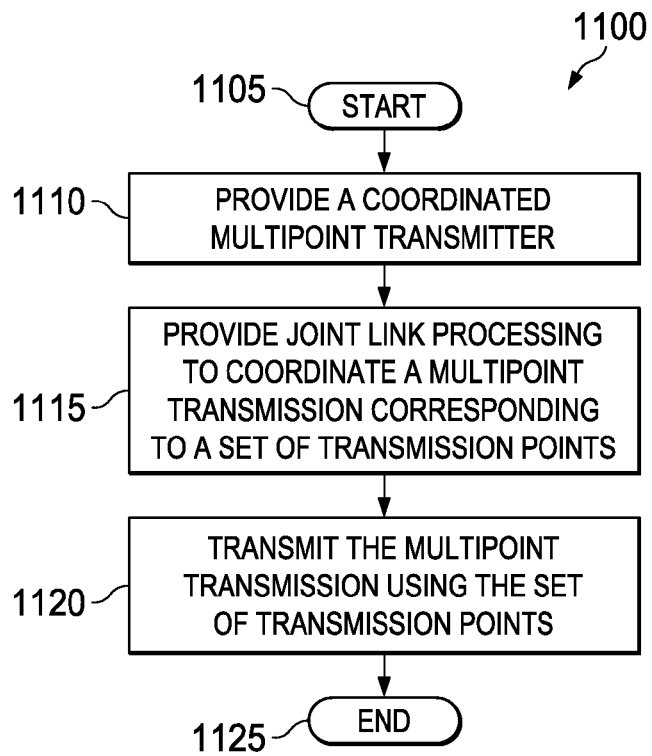
FIG. 11 illustrates a flow diagram of a method of operating a coordinated multipoint transmitter carried out according to the principles of the present disclosure.

FIG. 11 illustrates a flow diagram of a method 1100 of operating a coordinated multipoint transmitter carried out according to the principles of the present disclosure. The method 1100 starts in a step 1105 and is for use with a network MIMO super-cell. Then, in a step 1110, a coordinated multipoint transmitter is provided. In a step 1115, joint link processing is provided to coordinate a multipoint transmission corresponding to a set of transmission points.

In one embodiment, the joint link processing provides a joint link adaptation for a portion of the set of transmission points that is based on CQI, PMI or RI feedback from user equipment. In another embodiment, the joint link processing provides uplink and downlink signaling for a portion of the set of transmission points that is also based on CQI, PMI or RI feedback from user equipment. In yet another embodiment, the joint link processing provides different multipoint transmissions or a same multipoint transmission for a portion of the set of transmission points.

The multipoint transmission, using the set of base station transmitters, is transmitted in a step 1120. In one embodiment, the multipoint transmission corresponds to the set of transmission points selected from the group consisting of, a statically configured set, a semi-statically configured set and a dynamically configured set. The method 1100 ends in a step 1125.

Figure 12:
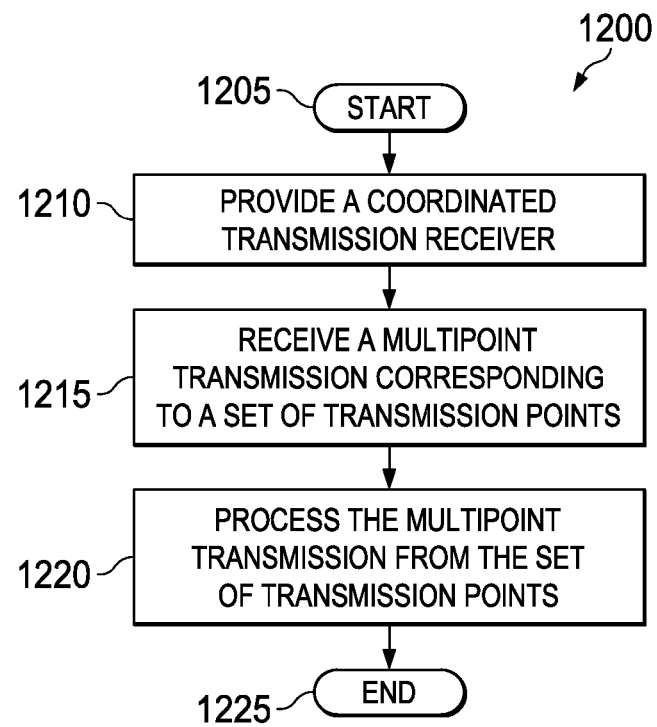
FIG. 12 illustrates a flow diagram of a method of operating a coordinated transmission receiver carried out according to the principles of the present disclosure.

FIG. 12 illustrates a flow diagram of a method 1200 of operating a coordinated transmission receiver carried out according to the principles of the present disclosure. The method 1200 starts in a step 1205 and is for use with a network MIMO super-cell. Then, in a step 1210, a coordinated transmission receiver is provided. A multipoint transmission is received corresponding to a set of transmission points, in a step 1215. The multipoint transmission is processed from the set of transmission points in a step 1220.

In one embodiment, the multipoint transmission is processed to provide joint or separate CQI, PMI or RI feedback information to a portion of the set of transmission points. In another embodiment, the multipoint transmission is processed to provide CQI, PMI or RI control information to a portion of the set of transmission points in orthogonal resources using one selected from the group consisting of time division multiplexing, frequency division multiplexing and code division multiplexing.

In yet another embodiment, the multipoint transmission is processed to provide uplink information corresponding to the set of transmission points selected from the group consisting of a statically configured set, a semi-statically configured set and a dynamically configured set. In still another embodiment, the multipoint transmission is processed to provide semi-static switching between full cell, dynamic cell or semi-static cell cooperation modes of operation. The method 1200 ends in a step 1225.

While the methods disclosed herein have been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Those skilled in the art to which the disclosure relates will appreciate that other and further additions, deletions, substitutions and modifications may be made to the described example embodiments without departing from the disclosure.

What is claimed is:

1. A coordinated multipoint transmitter for use with a network MIMO super-cell, comprising: a coordination unit configured to provide joint link processing to coordinate a multipoint transmission corresponding to a set of transmission points, wherein the joint link processing provides a joint link adaptation for a portion of the set of transmission points that is based on: channel quality indicator ("CQI"); precoding matrix indicator ("PMI"); and rank indicator ("RI"), wherein the coordination unit receives the joint link CQI, PMI and RI to the super-cell for each of the possible combinations of transmitters of the super cell; dynamically adapts the subset of transmitters taken from integer "N" available transmitters to optimize the average throughput across all the integer "N" cells based on an instantaneous channel based on said link quality indicator, therefore dynamically adapt said super cell, and a transmission unit configured to transmit the multipoint transmission using the set of transmission points of said super-cell.

2. The transmitter as recited in claim 1 wherein the multipoint transmission corresponds to the set of transmission points selected from the group consisting of:
   a statically configured set;
   a semi-statically configured set; and
   a dynamically configured set.

3. The transmitter as recited in claim 1 wherein the joint link processing provides uplink and downlink signaling for a portion of the set of transmission points that is based on at least one of CQI, PMI or RI feedback from user equipment.

4. The transmitter as recited in claim 1 wherein the joint link processing provides different multipoint transmissions or a same multipoint transmission for a portion of the set of transmission points.

5. The transmitter of claim 1, wherein the number of transmitter combinations of the set of transmission points is $2^{N-1}$, wherein "N" is an integer.

6. The transmitter of claim 1, wherein the channel quality indicator ("CQI"), precoding matrix indicator ("PMI"); and rank indicator ("RI") are based from feedback from a user equipment.

7. A method of operating a coordinated multipoint transmitter for use with a network MIMO super-cell, comprising: providing joint link processing to coordinate a multipoint transmission corresponding to a set of transmission points; wherein the joint link processing provides a joint link adaptation for a portion of the set of transmission points that is based on: channel quality indicator ("CQI"), precoding matrix indicator ("PMI"), and rank indicator ("RI"), receiving the joint CQI, PMI and RI link of the super-cell for each of the possible combinations of transmitters of the super cell; dynamically adapting the subset of transmitters taken from integer "N" available transmitters to optimize the average throughput across all the integer "N" integer: cells based on an instantaneous channel based on said link quality indicator, therefore dynamically adapt said super cell; and transmitting the multipoint transmission using the set of transmission points of said super cell.

8. The method as recited in claim 7 wherein the multipoint transmission corresponds to the set of transmission points selected from the group consisting of:
   a statically configured set;
   a semi-statically configured set; and
   a dynamically configured set.

9. The method as recited in claim 7 wherein the joint link processing provides uplink and downlink signaling for a portion of the set of transmission points that is based on at least one of CQI, PMI or RI feedback from user equipment.

10. The method as recited in claim 7 wherein the joint link processing provides different multipoint transmissions or a same multipoint transmission for a portion of the set of transmission points.

11. The method of claim 7, wherein the number of transmitter combinations of the set of transmission points is $2^{N-1}$, wherein "N" is an integer.

12. The method of claim 7, wherein the channel quality indicator ("CQI"), precoding matrix indicator ("PMI"); and rank indicator ("RI") are based from feedback from a user equipment.

13. A coordinated transmission receiver for use with a network MIMO super-cell, comprising: a reception unit configured to receive a multipoint transmission corresponding to a set of transmission points, wherein the joint link processing provides a joint link adaptation for a portion of the set of transmission points that is based on: channel quality indicator ("CQI"), precoding matrix indicator ("PMI"), and rank indicator ("RI"), wherein the provides the joint link CQI, PMI and RI to the super-cell for each of the possible combinations of transmitters of the super-cell; receiving a dynamically adapted subset of transmitters taken from integer "N" available transmitters to optimize the average throughput across all the integer "N: cells based on an instantaneous channel based on said link quality indicator, therefore dynamically adapt said super cell; and a processing unit configured to process the multipoint transmission from the set of transmission points.

14. The receiver as recited in claim 13 wherein the multipoint transmission is processed to provide CQI, PMI and RI control information to a portion of the set of transmission points in orthogonal resources using one selected from the group consisting of:
   time division multiplexing;
   frequency division multiplexing; and
   code division multiplexing.

15. The receiver as recited in claim 13 wherein the multipoint transmission is processed to provide uplink information corresponding to the set of transmission points selected from the group consisting of:
   a statically configured set;
   a semi-statically configured set; and
   a dynamically configured set.

16. The receiver as recited in claim 13 wherein the multipoint transmission is processed to provide semi-static switching between full cell, dynamic cell or semi-static cell cooperation modes of operation.

17. The receiver of claim 13, wherein the number of transmitter combinations of the set of transmission points is $2^{N-1}$, wherein "N" is an integer.

18. The receiver of claim 13, wherein the channel quality indicator ("CQI"), precoding matrix indicator ("PMI"); and rank indicator ("RI") are based from feedback from a user equipment.

19. A method of operating a coordinated transmission receiver for use with a network MIMO super-cell, comprising: receiving a multipoint transmission corresponding to a set of transmission points, wherein the joint link processing provides a joint link adaptation for a portion of the set of transmission points that is based on: channel quality indicator ("CQI"), precoding matrix indicator ("PMI"), and rank indicator ("RI"), wherein the receiver provides the joint link CQI, PMI and RI to the super-cell for each of the possible combinations of transmitters of the super-cell; receiving a dynamically adapted subset of transmitters taken from integer "N" available transmitters to optimize the average throughput across all the integer "N" cells based on an instantaneous channel based on said link quality indicator, therefore dynamically adapt said super cell; and processing the multipoint transmission from the set of transmission points.

20. The method as recited in claim 19 wherein the multipoint transmission is processed to provide CQI, PMI or RI control information to a portion of the set of transmission points in orthogonal resources using one selected from the group consisting of:
   time division multiplexing;
   frequency division multiplexing; and
   code division multiplexing.

21. The method as recited in claim 19 wherein the multipoint transmission is processed to provide uplink information corresponding to the set of transmission points selected from the group consisting of:
   a statically configured set;
   a semi-statically configured set; and
   a dynamically configured set.

22. The method as recited in claim 19 wherein the multipoint transmission is processed to provide semi-static switching between full cell, dynamic cell or semi-static cell cooperation modes of operation.

23. The method of claim 19, wherein the number of transmitter combinations of the set of transmission points is $2^{N-1}$, wherein "N" is an integer.

24. The method of claim 19, wherein the channel quality indicator ("CQI"), precoding matrix indicator ("PMI"); and rank indicator ("RI") are based from feedback from a user equipment.

* * * * *